(12) United States Patent
Lanzarini et al.

(10) Patent No.: US 11,326,930 B2
(45) Date of Patent: May 10, 2022

(54) SYSTEM AND METHOD FOR WEIGHING CONTAINERS

(71) Applicant: G.D S.p.A., Bologna (IT)

(72) Inventors: Luca Lanzarini, Crespellano (IT); Luca Testoni, Castel Maggiore (IT); Carlo Moretti, Bologna (IT); Fabio Gaudenzi, Casalecchio di Reno (IT); Marco Cesari, Marzabotto (IT); Andrea Tallerico, Catanzaro (IT); Valerio Amorati, Argelato (IT); Luca Federici, Bologna (IT)

(73) Assignee: G.D S.P.A., Bologna (IT)

( * ) Notice: Subject to any disclaimer, the term of this patent is extended or adjusted under 35 U.S.C. 154(b) by 49 days.

(21) Appl. No.: 16/643,771

(22) PCT Filed: Aug. 30, 2018

(86) PCT No.: PCT/IB2018/056634
§ 371 (c)(1),
(2) Date: Mar. 2, 2020

(87) PCT Pub. No.: WO2019/048998
PCT Pub. Date: Mar. 14, 2019

(65) Prior Publication Data
US 2021/0302221 A1   Sep. 30, 2021

(30) Foreign Application Priority Data

Sep. 5, 2017 (IT) .......................... 102017000099359

(51) Int. Cl.
*G01G 17/00* (2006.01)
*B65B 1/46* (2006.01)
(Continued)

(52) U.S. Cl.
CPC ............... *G01G 17/00* (2013.01); *B65B 1/46* (2013.01); *B65B 3/28* (2013.01); *B65G 47/847* (2013.01)

(58) Field of Classification Search
CPC .. G01G 17/00; B65B 1/46; B65B 3/28; B65B 47/847
(Continued)

(56) References Cited

U.S. PATENT DOCUMENTS 5,004,093 A * 4/1991 Blezard .................. B65B 43/46
                                                            141/170
5,064,009 A * 11/1991 Melcher ................. G01N 5/045
                                                            177/245
(Continued)

FOREIGN PATENT DOCUMENTS

CN           1457318 A      11/2003
CN           1736828 A       2/2006
(Continued)

OTHER PUBLICATIONS

International Search Report and Written Opinion dated Oct. 22, 2018 for counterpart International Patent Application No. PCT/IB2018/056634.

(Continued)

*Primary Examiner* — Randy W Gibson
(74) *Attorney, Agent, or Firm* — Shuttleworth & Ingersoll, PLC; Timothy Klima

(57) ABSTRACT

A system for weighing containers includes: a weighing station and a conveying path extending from an upstream infeed section to a downstream outfeed section. The conveying path includes a gripping stretch for gripping the containers and a release stretch for releasing the containers, disposed between the infeed section and the outfeed section; and a conveying device for conveying the containers from (Continued)

the infeed section to the gripping stretch, and the weighed containers from the release stretch to the outfeed section. The conveying device includes first and second groups of housings for receiving the containers and moving them from the infeed section to the gripping stretch. A gripping and transferring device transfers the containers from the gripping stretch to the weighing station and from the weighing station to the release stretch. The first and second groups are movable independently of each other from the infeed section to the gripping stretch.

18 Claims, 27 Drawing Sheets

(51) Int. Cl.
*B65B 3/28* (2006.01)
*B65G 47/86* (2006.01)

(58) Field of Classification Search
USPC .................................................. 177/145
See application file for complete search history.

(56) References Cited

U.S. PATENT DOCUMENTS

| | | | | |
|---|---|---|---|---|
| 5,092,414 A * | 3/1992 | Blezard | ............. | G01G 15/00 |
| | | | | 141/129 |
| 5,115,876 A * | 5/1992 | Chang | ............. | G01G 15/00 |
| | | | | 177/145 |
| 6,096,983 A * | 8/2000 | Ozaki | ............. | G01G 15/00 |
| | | | | 177/52 |
| 6,627,826 B2 * | 9/2003 | Cavina | ............. | B65B 43/52 |
| | | | | 177/145 |
| 6,800,818 B2 * | 10/2004 | Balboni | ............. | B65B 3/003 |
| | | | | 141/83 |
| 2003/0102169 A1 | 6/2003 | Balboni et al. | | |
| 2012/0090268 A1 | 4/2012 | Krauss et al. | | |

FOREIGN PATENT DOCUMENTS

| | | |
|---|---|---|
| CN | 201221973 Y | 4/2009 |
| CN | 101848838 A | 9/2010 |
| CN | 101981420 A | 2/2011 |
| CN | 102460091 A | 5/2012 |
| CN | 203241119 U | 10/2013 |
| CN | 103826997 A | 5/2014 |
| CN | 105636866 A | 6/2016 |
| CN | 106276099 A | 1/2017 |
| CN | 107787297 A | 3/2018 |
| DE | 102004035061 A1 | 2/2006 |
| DE | 102009027452 A1 | 1/2011 |
| EP | 1988018 A2 | 11/2008 |
| JP | 4440610 B2 | 3/2010 |
| JP | 4781256 B2 | 9/2011 |
| WO | 2007003407 A1 | 1/2007 |
| WO | 2016170488 A1 | 10/2016 |

OTHER PUBLICATIONS

Chinese Office Action dated Jan. 6, 2021 from counterpart Chinese Patent Application No. 201880057254.3.

* cited by examiner

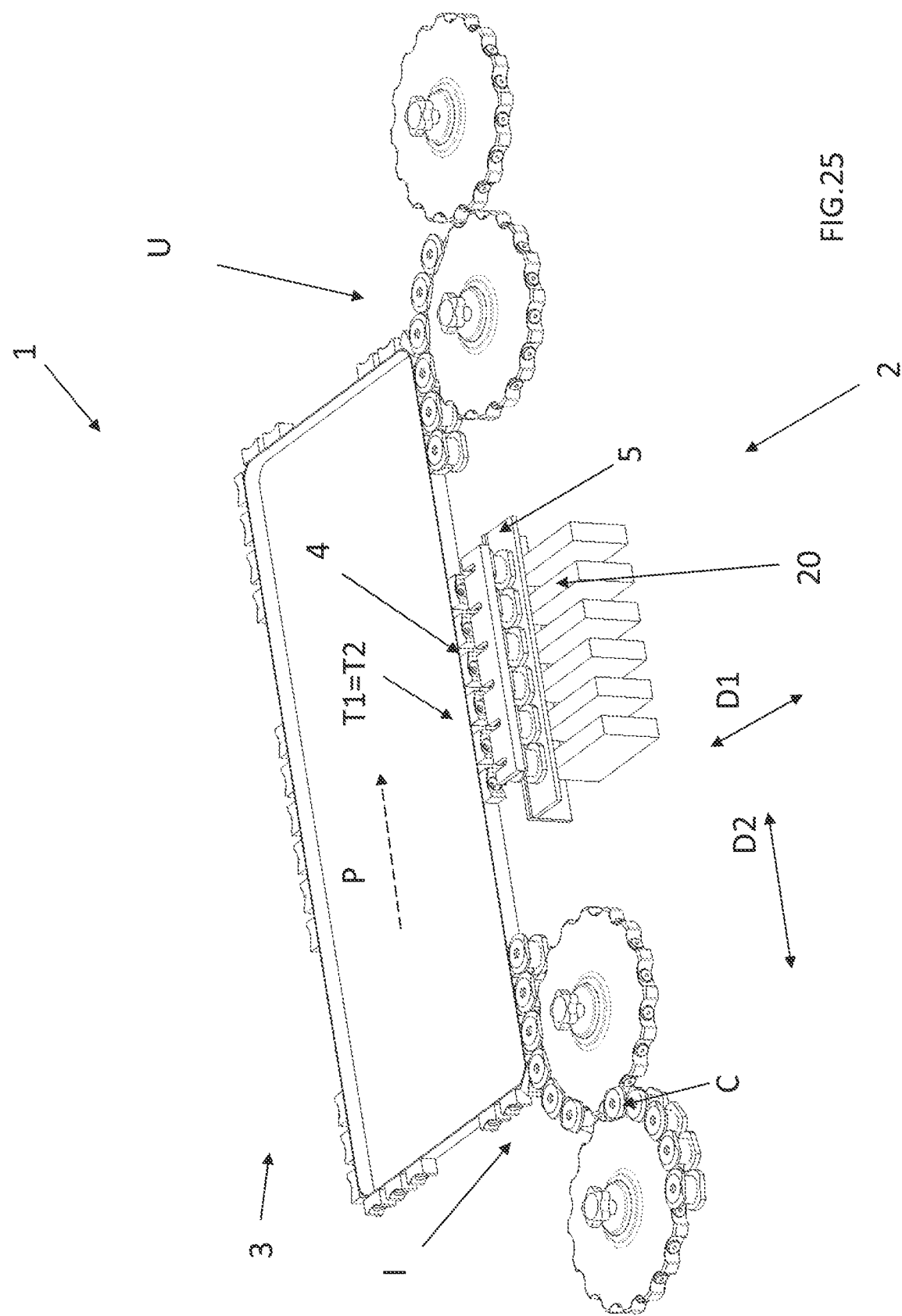

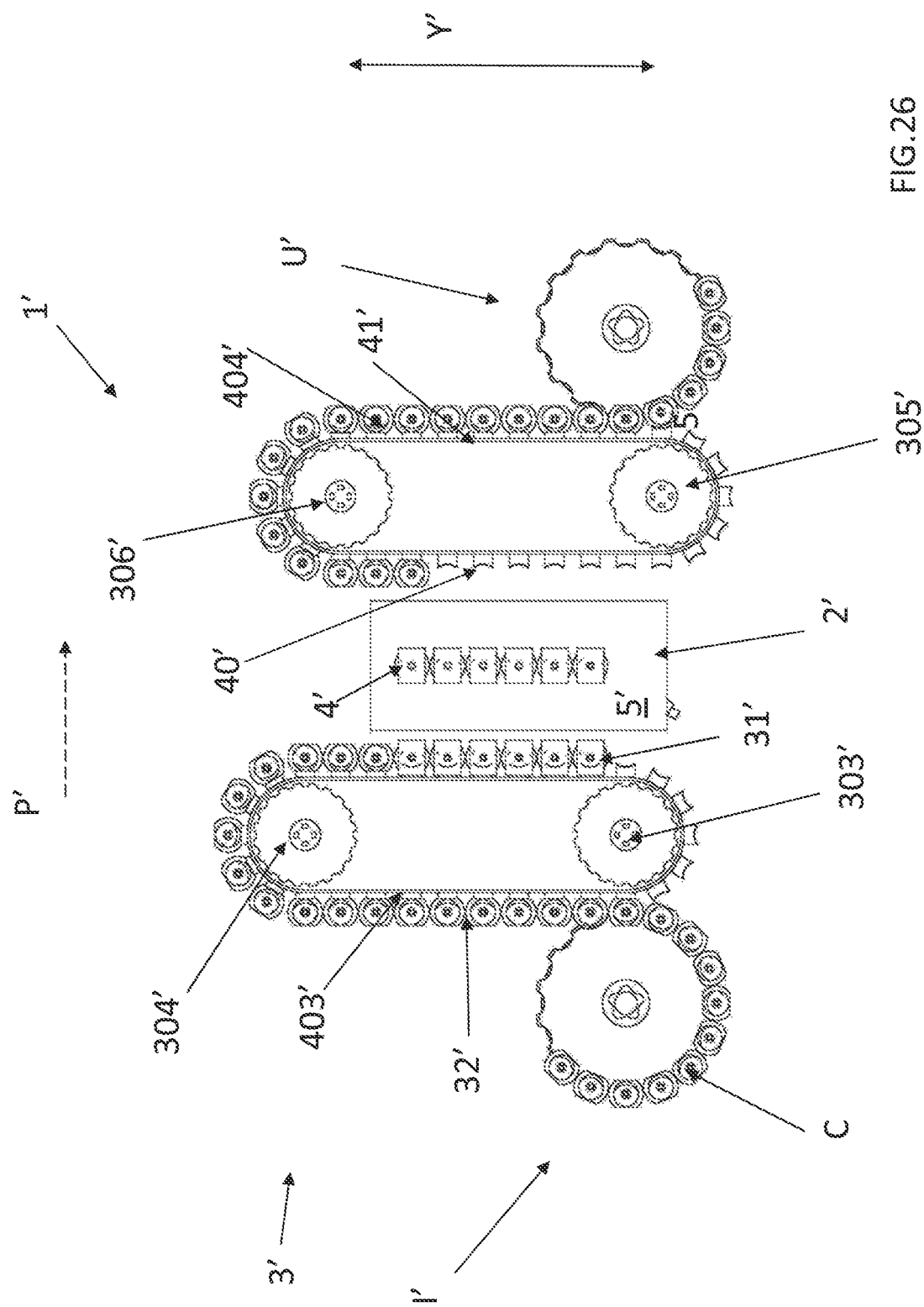

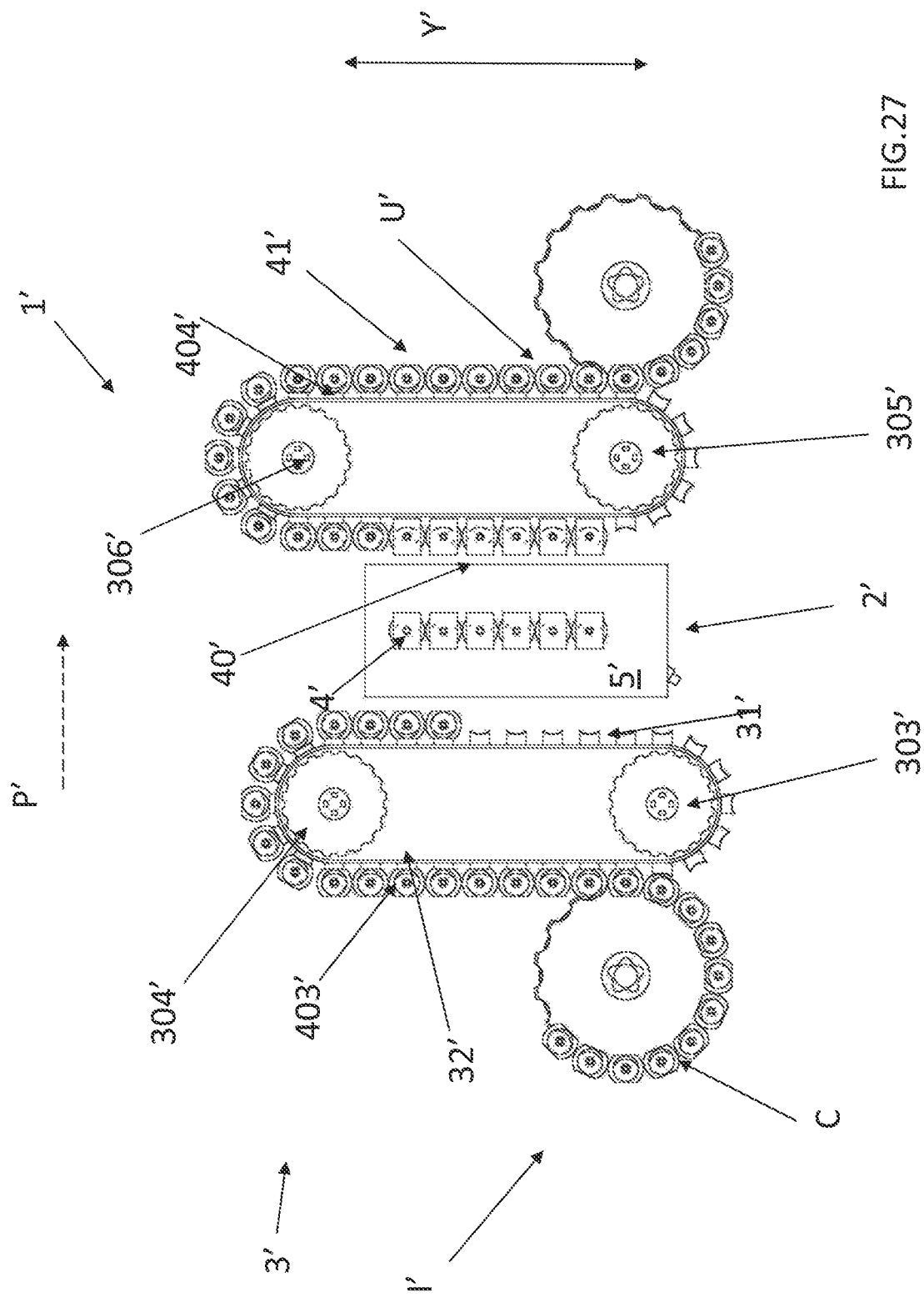

US 11,326,930 B2

SYSTEM AND METHOD FOR WEIGHING CONTAINERS

This application is the National Phase of International Application PCT/IB2018/056634 filed Aug. 30, 2018 which designated the U.S.

This application claims priority to Italian Patent Application No. 102017000099359 filed Sep. 5, 2017, which application is incorporated by reference herein.

TECHNICAL FIELD

This invention addresses the technical field of container weighing.

More specifically, the invention relates to a system and a method for weighing containers. By container is meant a receptacles of any kind for example, a vial, a bottle (used, for example, in the pharmaceutical sector but not only there), or an electronic cigarette cartridge.

BACKGROUND ART

The containers need to be weighed before they are filled so as to be able to precisely determine the amount of product (liquid or powder) inside them when they are full.

Document EP1988018 describes a system for weighing containers which are conveyed continuously by an endless conveyor provided with housings.

The system comprises a product filling station, a weighing scale mounted alongside the conveyor, and two oscillating arms on the outside of the conveyor. The first oscillating arm is adapted to pick up a container from a housing on the conveyor and to place it on the scale. More in detail, while the conveyor moves, the first oscillating arm picks up a single container using a gripper and moves it through a circular arc.

Once the container has been weighed, the second oscillating arm picks the container from the scale and puts it back in the conveyor housing which had been left empty. More in detail, the second oscillating arm moves the weighed container through a circular arc similar and mirror symmetrical to the movement of the first arm.

This movement of the two oscillating arms is necessary because the endless conveyor, in order to reduce the total working time, moves continuously and the two oscillating arms must therefore "chase" it as it moves.

This system (and the related method) does not, however, allow all the containers to be weighed and thus leaves a wide margin of uncertainty as to the actual amount of product filled into each container.

Moreover, the proposed system is structurally complex and cumbersome.

DISCLOSURE OF THE INVENTION

The aim of this invention is to overcome the above mentioned disadvantages.

This aim is achieved by proposing a system and a method for weighing containers according to the accompanying claims.

Advantageously, the system and method according to the invention can overcome the disadvantages of the prior art because they allow all the containers to be weighed.

The system is also structurally simple and has a limited footprint.

BRIEF DESCRIPTION OF THE DRAWINGS

Further advantages are more apparent in the specification which follows, with reference to the accompanying drawings, in which:

FIGS. 23-25 are three schematic perspective views of a second embodiment of the container weighing system of the invention in different operating situations;

FIGS. 26 and 27 are two schematic plan views of a third embodiment of the container weighing system of the invention in different operating situations.

DETAILED DESCRIPTION OF PREFERRED EMBODIMENTS OF THE INVENTION

Figure 1:
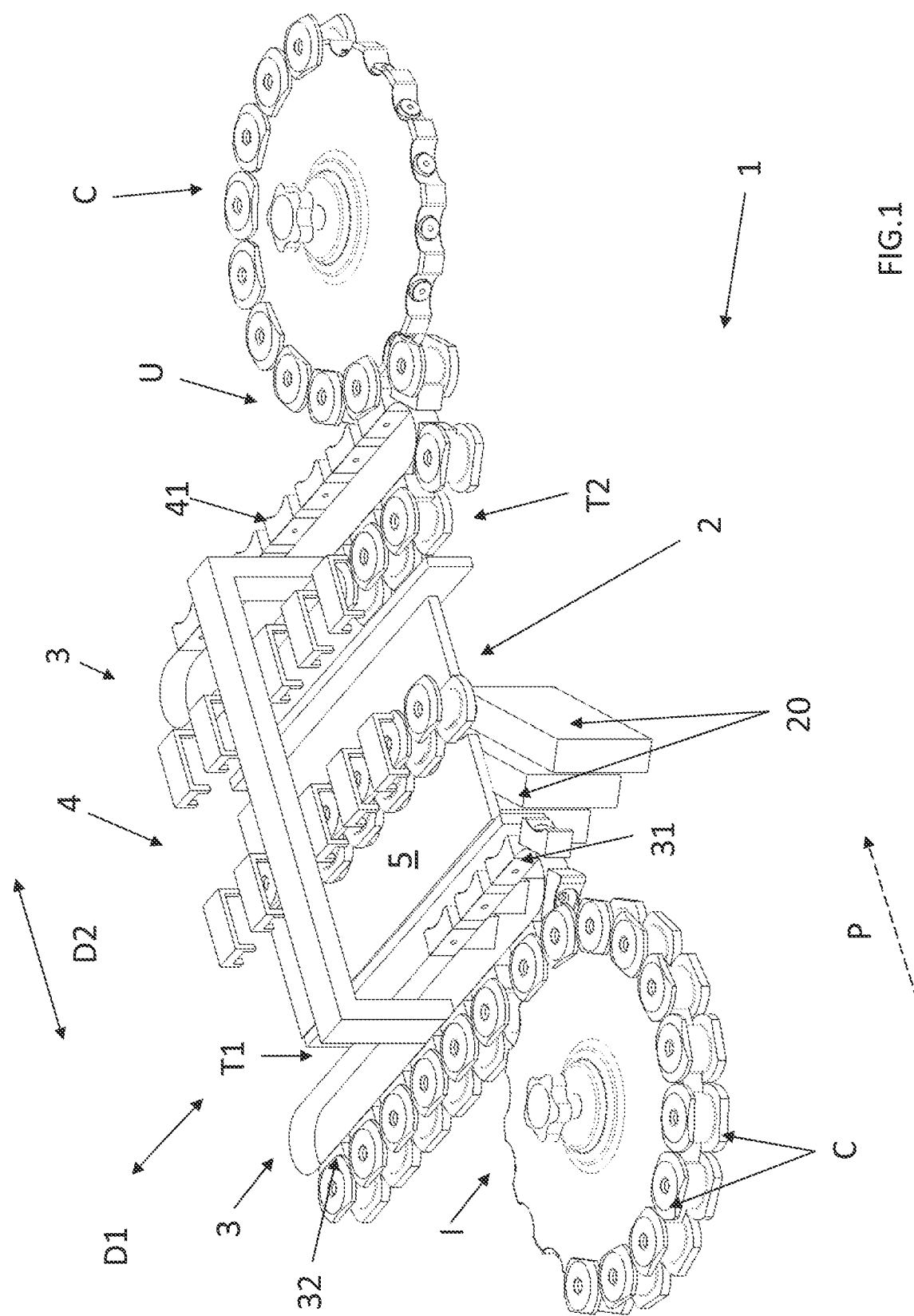
FIG. 1 is a partial, schematic perspective view of a first embodiment of a container weighing system in a first operating situation.
Figure 2:
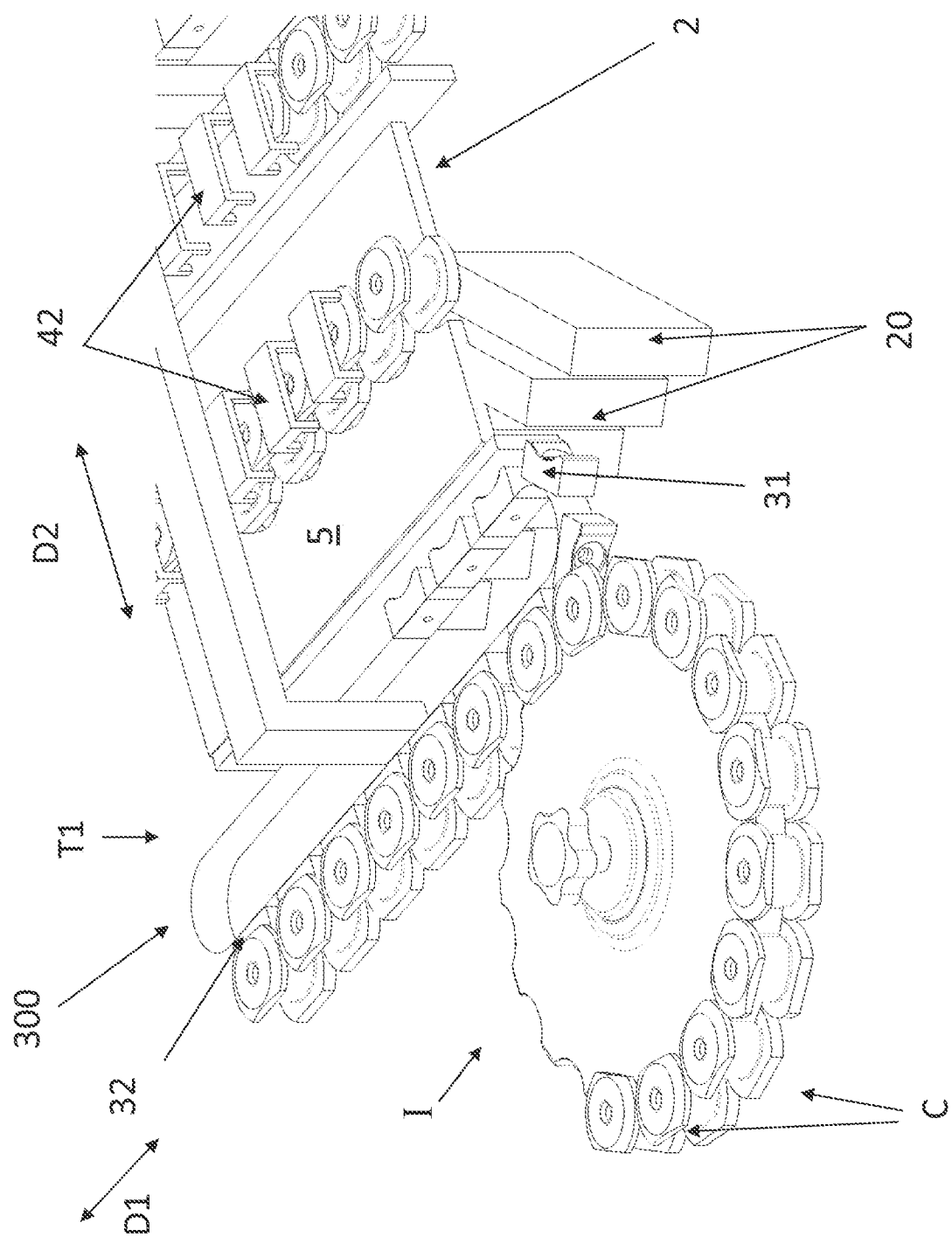
FIG. 2 is an enlarged view of a detail from FIG. 1.
Figure 3:
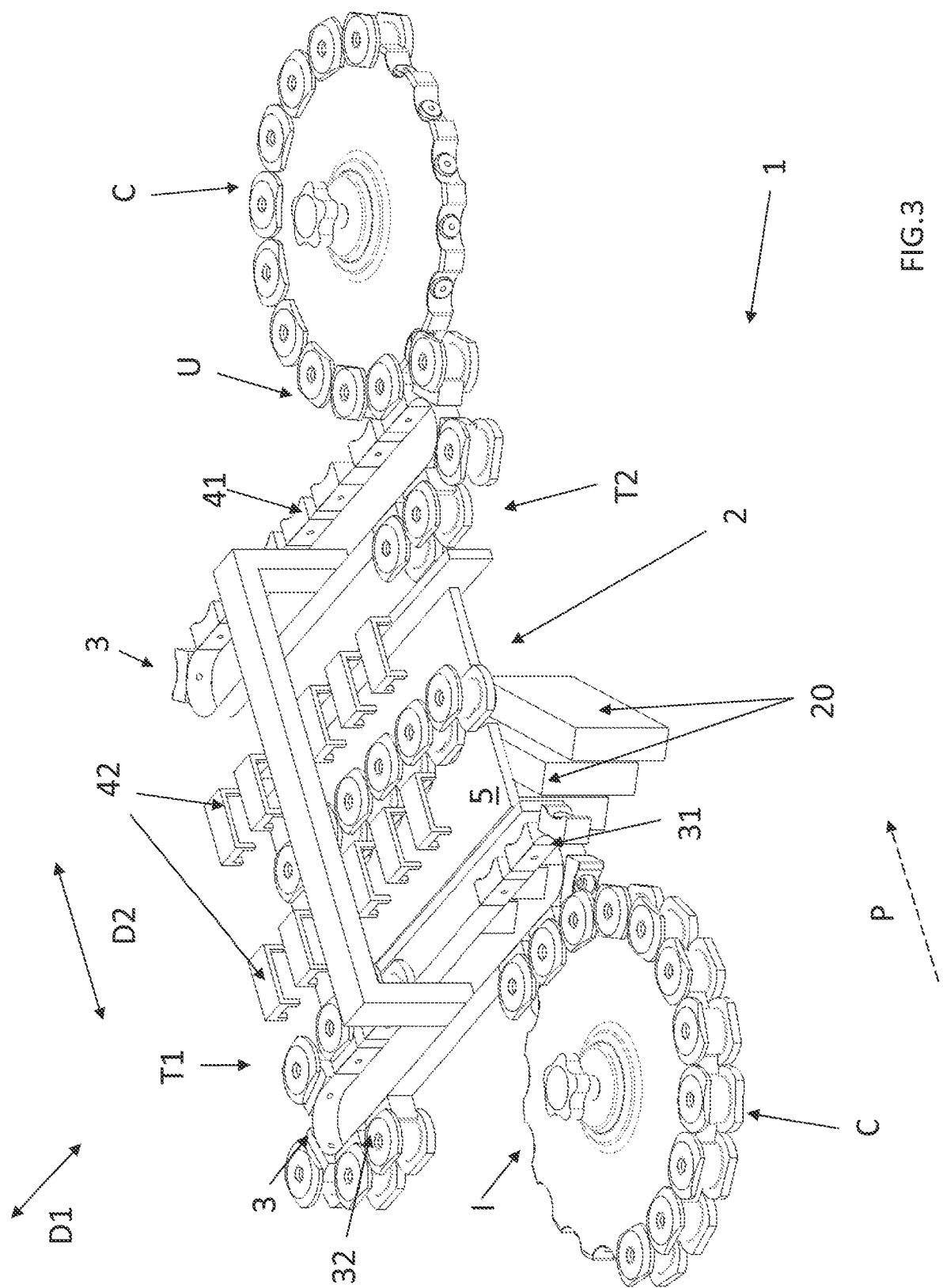
FIG. 3 is a view similar to that of FIG. 1 but in a different operating situation.

With reference to the accompanying drawings, the numerals 1, 1' denote a system for weighing containers C according to this invention.

As already stated in the introductory section, the containers C may be of any kind—for example, vials, bottles (used, for example, in the pharmaceutical sector but not only there), or electronic cigarette cartridges (in the preferred embodiment).

Generally speaking, since some containers C such as vials or parts of electronic cigarettes are reduced in size, fragile or unstable in position on account of their shape, the system 1, 1' according to the invention may comprise a plurality of holders (also known as "buckets", shown in the accompanying drawings) to support the containers C before, after and/or during filling. With reference to the drawings, all conveying operations are performed by means of the buckets in which the containers C are placed. Whatever the case, the term "container C" is used herein to denote both the container to be filled and the container and bucket together.

With reference in particular to FIGS. 1-25, the system 1 for weighing containers C comprises: a weighing station 2 for weighing the containers C; a conveying path P of the containers C, extending from an infeed section I, upstream of the weighing station 2, to an outfeed section U, downstream of the weighing station 2.

The conveying path P also comprises a gripping stretch T1 for gripping the containers C and a release stretch T2 for releasing the containers C, which are interposed between the infeed section I and the outfeed section U (better described below).

The system 1 also comprises conveying means 3, disposed along the conveying path P for conveying the containers C to be weighed from the infeed section I to the gripping stretch T1, and the weighed containers C from the release stretch T2 to the outfeed section U.

The conveying means 3 comprise at least a first group of housings 31 and a second group of housings 32, adapted to receive the containers C and movable along the conveying path P from the infeed section I to the gripping stretch T1.

The system 1 further comprises gripping and transferring means 4 for transferring the containers C to be weighed from the gripping stretch T1 (where the containers C are disposed inside the first and second housings 31 and 32) to the weighing station 2, and the weighed containers C from the weighing station 2 to the release stretch T2 of the conveying path P.

The gripping stretch T1 and the release stretch T2 of the conveying path P thus correspond to those points where the containers C are respectively picked up from, and released onto, the conveying means 3. With reference to the drawings, the gripping stretch T1 and the release stretch T2 of the conveying path P are parallel to each other and the conveying means 3 extend from them (as will become clearer below).

In particular, the first group of housings 31 and the second group of housings 32 of the conveying means 3 are movable independently of each other along the conveying path P, from the infeed section I to the gripping stretch T1.

Advantageously, unlike the prior art, the system 1 according to the invention guarantees weighing all the containers C moving along the conveying path P and not just some of them. In effect, the fact that the first group of housings 31 and the second group of housings 32 are movable independently of each other from the infeed section I to the gripping stretch T1 (and preferably vice versa) means that while the containers C disposed at one of the two groups of housings are weighed, other containers C are conveyed by the other group of housings along the conveying path P and can be weighed without affecting the productivity of the machine.

In other words, the system 1 configured this way allows introducing "pauses" which affect only the containers C being weighed at a particular moment, without affecting the rest of the system 1. In effect, it is known that weighing the containers C requires a certain amount of time and stopping the machine would have a negative effect on the overall productivity of the system 1.

In the preferred embodiment, when the first group of housings 31 is at the gripping stretch T1, the gripping and transferring means 4 (pick up and) transfer simultaneously all the containers C inside the first group of housings 31 to the weighing station 2; similarly, when the second group of housings 32 is at the gripping stretch T1, the gripping and transferring means 4 (pick up and) transfer simultaneously all the containers inside the second group of housings 32 to the weighing station 2. Thus, all the containers C in the first group of housings 31 can be weighed simultaneously in the weighing station 2 and, similarly, all the containers C in the second group of housings 32 at the weighing station 2 can be weighed simultaneously in the weighing station 2 (as explained in more detail below). Advantageously, the fact that the gripping and transferring means 4 simultaneously transfer to the weighing station 2 a plurality of containers C (that is, those in the first group of housings 31 and in the second group of housings 32) means that the containers C can all be conveyed along the conveying path P and all weighed very quickly. In other words, there is a guarantee that all the containers C (and not just a statistical "random sample" of them) are weighed rapidly.

Conveyors of the star wheel type (as illustrated in the accompanying drawings, in particular FIGS. 2 and 12) may be mounted at the infeed section I and at the outfeed section U of the conveying path P; these conveyors feed the containers C continuously to the infeed section I and receive them continuously at the outfeed section U. Alternatively, different devices used for this purpose that is, to feed and receive the containers continuously—may obviously also be provided.

With reference to the above mentioned drawings, each housing of the first group of housings 31 and of the second group of housings 32 receives only one container C.

Again with reference to the above mentioned drawings, the number of housings of the first group of housings 31 coincides with the number of housings of the second group of housings 32 but, alternatively, the number of housings of the first group of housings 31 might be different from the number of housings of the second group of housings 32.

With reference to the preferred embodiment illustrated in the accompanying drawing, the gripping stretch T1 and the release stretch T2 extend along a first orientation D1 and the gripping and transferring means 4 transfer the containers C from the gripping stretch T1 to the weighing station 2 and/or from the weighing station 2 to the release stretch T2 by moving the containers along a second orientation D2 perpendicular to the first orientation D1.

When they are at the gripping stretch T1, the housings of the first and second groups of housings 31 and 32 are disposed along the first orientation D1. With reference to the drawings, the housings (hence the containers C) at the gripping stretch T1 are arranged in a row extending along the first orientation D1 (see FIG. 5).

Advantageously, that way, the total productivity times of the system 1 are kept particularly low compared to prior art systems thanks to the fact that the gripping and transferring means 4 transfer the containers C from the gripping stretch T1 to the weighing station 2 and from the weighing station 2 to the release stretch T2 along the shortest possible path. Moreover, the overall dimensions needed to move the containers C are also limited.

Alternatively, in variants not illustrated, the gripping and transferring means 4 can transfer the containers C from the gripping stretch T1 to the weighing station 2 and/or from the weighing station 2 to the release stretch T2 by moving them along an orientation which is not perpendicular to the first orientation (for example along a path that is oblique or in the shape of a circular arc relative to the gripping and release stretches, that is, relative to the first orientation).

Preferably, the gripping and transferring means simultaneously transfer all the containers C present in the weighing station towards the release stretch T2.

In the preferred embodiment, the weighing station 2 comprises a plurality of scales 20 (only partly visible and represented schematically in the accompanying drawings), each used to weigh one container C; also, the gripping and transferring means 4 are adapted to transfer each container C to be weighed (from the gripping stretch T1) to a respective scale 20. More specifically, the number of scales 20 is at least equal to the maximum number of containers C in the first group of housings 31 or in the second group of housings 32, each used to weigh only one container C. This guarantees that all the containers C in the first group of housings 31 and in the second group of housings 32 are weighed independently of each other.

With reference to the accompanying drawings, the weighing station 2 further comprises a supporting surface 5, for supporting the containers C during their transfer from the gripping stretch T1 to the scales 20 and from the scales 20 to the release stretch T2. The supporting surface 5 comprises a plurality of through openings 50 (visible for example in FIGS. 8, 9, 23 and 24), each facing a corresponding scale 20; the gripping and transferring means 4 release the containers C to be weighed at the openings 50 of the supporting surface 5 in order to engage the openings 50 (which are of a size suitable for this purpose). Again with reference to the accompanying drawings, the supporting surface 5 is substantially horizontal in orientation.

More in detail, the supporting surface 5 is movable vertically (that is to say, it can perform a movement which is perpendicular to the orientation of the supporting surface 5 itself) between a raised position, above the scales 20, and a lowered position, substantially at the scales 20. The openings 50 of the supporting surface 5 and the scales 20 are configured in such a way that when the supporting surface 5 is moved from its raised position to its lowered position, the containers C disengage the openings 50 and come into contact with the scales 20 and are weighed, and so that when the supporting surface 5 is moved from its lowered position to its raised position, the containers C engage the openings 50 again and disengage the scales 20. For example, each scale 20 has a protruding portion (shown in more detail in FIGS. 8 and 9) which is at a position and of a size such as to be inserted into a corresponding opening 50 of the supporting surface 5 (see FIG. 8, for example) so that once the supporting surface 5 has moved from the raised position to the lowered position, each container C comes into contact with the protruding portion of the respective scale 20 which weighs it.

Advantageously, the supporting surface 5 prevents the containers C from reaching the scales 20 by scraping: the scales are very high precision, delicate instruments which would be easily damaged if subjected to stresses different from those strictly connected with their function.

In the preferred embodiment of the invention, the conveying means 3 comprise a first conveying unit 300 (shown in detail in FIGS. 18 and 19) which in turn comprises: a first endless belt 33, which carries the first group of housings 31, and two first pulleys 35, around which the first belt 33 is looped and which, together with the first belt 33, move the first group of housings 31.

The first conveying unit 300 also comprises a second endless belt 34 which carries the second group of housings 32, and two second pulleys 36, around which the second belt 34 is looped and which, together with the second belt 34, move the second group of housings 32 (refer once again in particular to FIGS. 18 and 19).

With reference to the accompanying drawings, the pulleys have a vertical axis and the sections of the belts looped round the pulleys lie on the gripping stretch T1 and on the release stretch T2 of the conveying path P, along the first orientation D1.

More specifically, the two first pulleys 35 and the two second pulleys 36 are movable independently of each other and are mounted respectively in pairs, juxtaposed (more specifically superposed) and coaxial with each other.

The above described feature allows the first and second groups of housings 31 and 32 to be moved independently of each other and is structurally simple and limited in cost. Other alternatives are possible, however, as described in more detail below.

Figure 23:
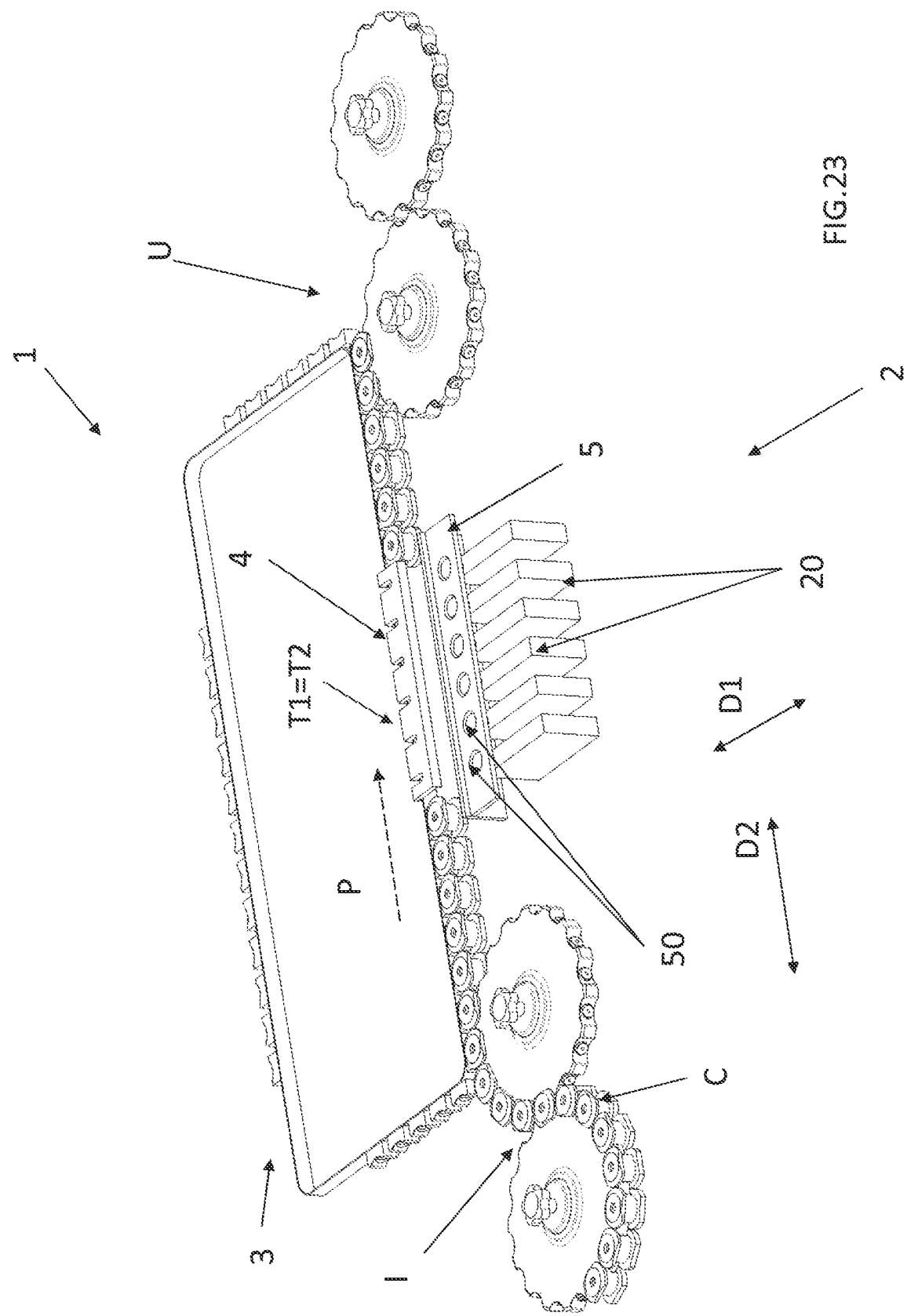
Figure 24:
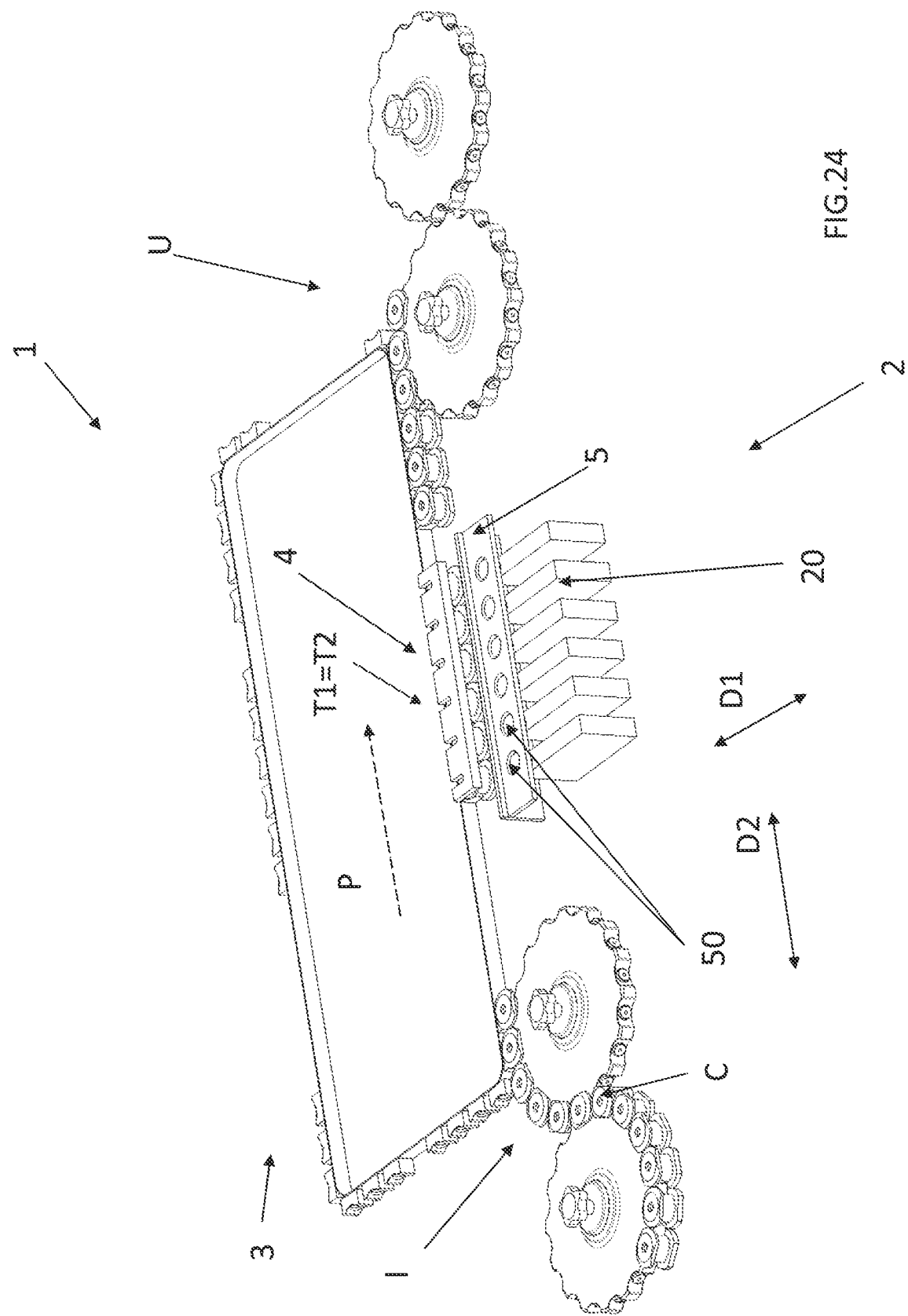

In the embodiment illustrated in FIGS. 23-25, the weighing station 2 is disposed on the outside of the conveying path P of the containers C, alongside the conveying means 3; moreover, the container C gripping stretch T1 and the container C release stretch T2 of the conveying path P coincide. In other words, the conveying means 3 extend from the infeed section I to the outfeed section U of the conveying path P, preferably in a straight line (as in the case illustrated in the above mentioned figures). In this case, therefore, each container C, after being weighed, may be disposed in the same housing it was disposed in before being weighed.

With reference in particular to FIGS. 23-25, the conveying means 3 (two belts and four pulleys, as described above) define a closed profile (substantially rectangular in shape).

Advantageously, this embodiment allows other operations to be carried out, if necessary, on one or more sections of the closed profile defined by the conveying means 3—for example, the one distal from the weighing station 2 (opposite the gripping stretch T1 and the release stretch). By way of example, these operations may consist in inspecting a sampled group of containers C; these, after being weighed, are not conveyed towards the outfeed section U and, instead, continue travelling along the closed profile defined by the belts 33, 34 to reach inspection stations (not illustrated).

With reference to FIGS. 23-25, the weighing station 2 is on the outside of the closed profile defined by the belts 33, 34. This solution allows easier access to the weighing station 2 when necessary (for example, malfunctioning, cleaning or maintenance).

In an alternative not illustrated, the weighing station 2 is on the inside of the closed profile defined by the conveying means 3 (but in any case always on the outside of the conveying path P). This solution is particularly compact.

Now described briefly below is the operation of the system 1 according to the embodiment described above and illustrated in FIGS. 23-25.

The containers C, transported for example by means of buckets (as specified previously), are fed by the infeed station to the gripping stretch T1 of the conveying path P for example by means of the above described star wheel feeders, which release a first group of containers C into the first group of housings 31, which may advance towards the gripping stretch T1. In the meantime, a second group of containers C is received by the second group of housings 32.

At this point, the first group of housings 31 is at the gripping stretch T1 (which, in this embodiment, as stated above, coincides with the release stretch T2) and remains stationary until the respective containers C are: picked up by the gripping and transferring means 4 (which, in this case, may comprise a plurality of upturned U-shaped gripper elements 42 arranged in a row); placed on the supporting surface 5; weighed on the scales 20 (by moving the supporting surface 5 as described above); picked up again by the gripping and transferring means 4 and released onto the same group of housings. The latter can then proceed towards the outfeed section U where, for example, one or more star wheel conveyors are mounted.

In the meantime, the second group of housings 32 has reached the gripping stretch T1/release stretch T2 to allow weighing the respective containers C, while the first group of housings 31, now empty, moves along the closed profile defined by the belts and is positioned at the infeed section I to receive other containers C.

Alternatively to the above, in a variant not illustrated, the gripper elements mentioned above might not be present and, instead, the containers might be gripped and transferred by the gripping elements supporting surface itself, adapted and structured to disengage the containers from the respective housings and, after weighing, replace them in the same housings. According to this solution, for example, the supporting surface may perform a cyclic stroke in which it moves translationally twice vertically and twice horizontally to define a substantially rectangular, closed path to pick up, weigh and put the containers back in place. Obviously, other means suitable for this purpose might be provided.

With reference to FIGS. 1-17, the conveying means 3 further comprise a third group of housings 40 and a fourth group of housings 41, adapted to receive the containers C and movable independently of each other along the conveying path P from the release stretch T2 to the outfeed section U.

When they are at the release stretch T2, the housings of the third and fourth groups of housings 40 and 41 are disposed along the first orientation D1. With reference to the above mentioned drawings, in particular FIG. 10, the housings (of the third group 40 or of the fourth group 41), hence the containers C, are, at the release stretch T2, disposed in a row extending along the first orientation D1 (as already stated for the housings disposed along the gripping stretch T1).

As shown in FIGS. 1-17, the weighing station 2 is positioned along the conveying path P of the containers C (that is, on the inside of the conveying path P), in particular between the gripping stretch T1 and the release stretch T2 of the conveying path P.

Advantageously, this embodiment offers particularly reduced dimensions (at least along one of the two directions of extension) and facilitates access to the entire system 1 in case of need (for example, maintenance, cleaning or other operations).

With reference to the above mentioned drawings, each housing of the third group of housings 40 and of the fourth group of housings 41 receives only one container C.

Again with reference to the above mentioned drawings, the number of housings of the third group of housings 40 coincides with the number of housings of the fourth group of housings 41 but, alternatively, might be different. Whatever the case, the number of housings of the third group of housings 40 is at least equal to the maximum number of containers C in the first group of housings 31 or in the second group of housings 32, so as to enable all the weighed containers C to be received in the release stretch T2 (the same applies to the number of housings of the fourth group of housings 41).

With reference to the embodiment described above, the first conveying unit 300 is positioned upstream of the weighing station 2. Downstream of the weighing station 2, the conveying means 3 also comprise: a second conveying unit 400 in turn comprising a third endless belt 43, carrying the third group of housings 40; and two third pulleys (not illustrated), around which the third belt 43 is looped and which, together with the third belt 43, move the third group of housings 40. The second conveying unit 400 also comprises a fourth endless belt 44 which carries the fourth group of housings 41, and two fourth pulleys (not illustrated), around which the fourth belt 44 is looped and which, together with the fourth belt 44, move the fourth group of housings 41.

More in detail, the two third pulleys and the two fourth pulleys (which, in the accompanying drawings, have a vertical axis) are movable independently of each other and are mounted respectively in pairs, juxtaposed (more specifically, superposed) and coaxial.

The above described feature allows moving the third and the fourth group of housings 41 in the same way as described above with regard to the first and the second group of housings 32.

Figure 18:
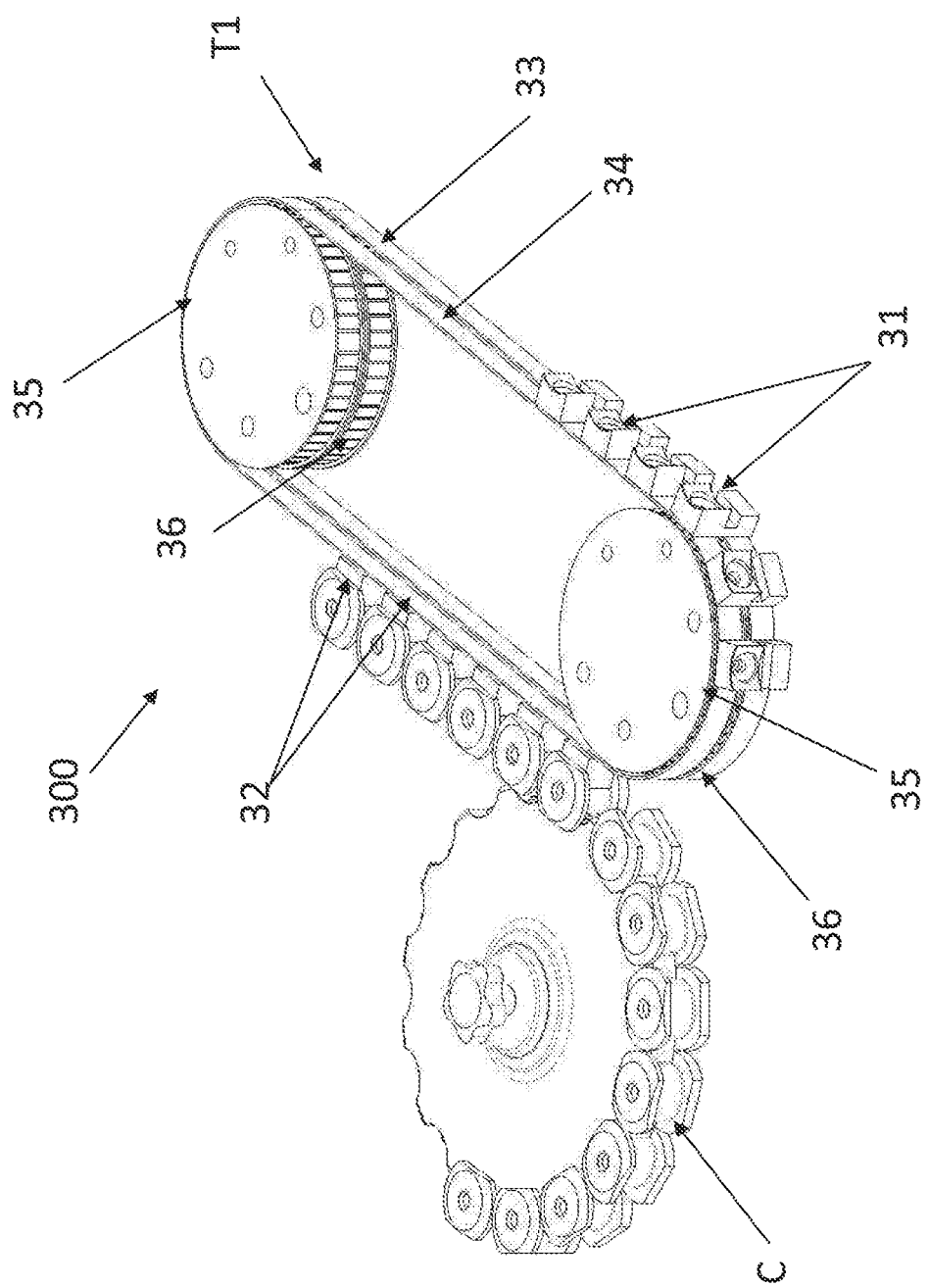
FIGS. 18 and 19 are two partial, enlarged views of the system of the invention according to the embodiment of FIGS. 1-17, in two different operating situations.
Figure 19:
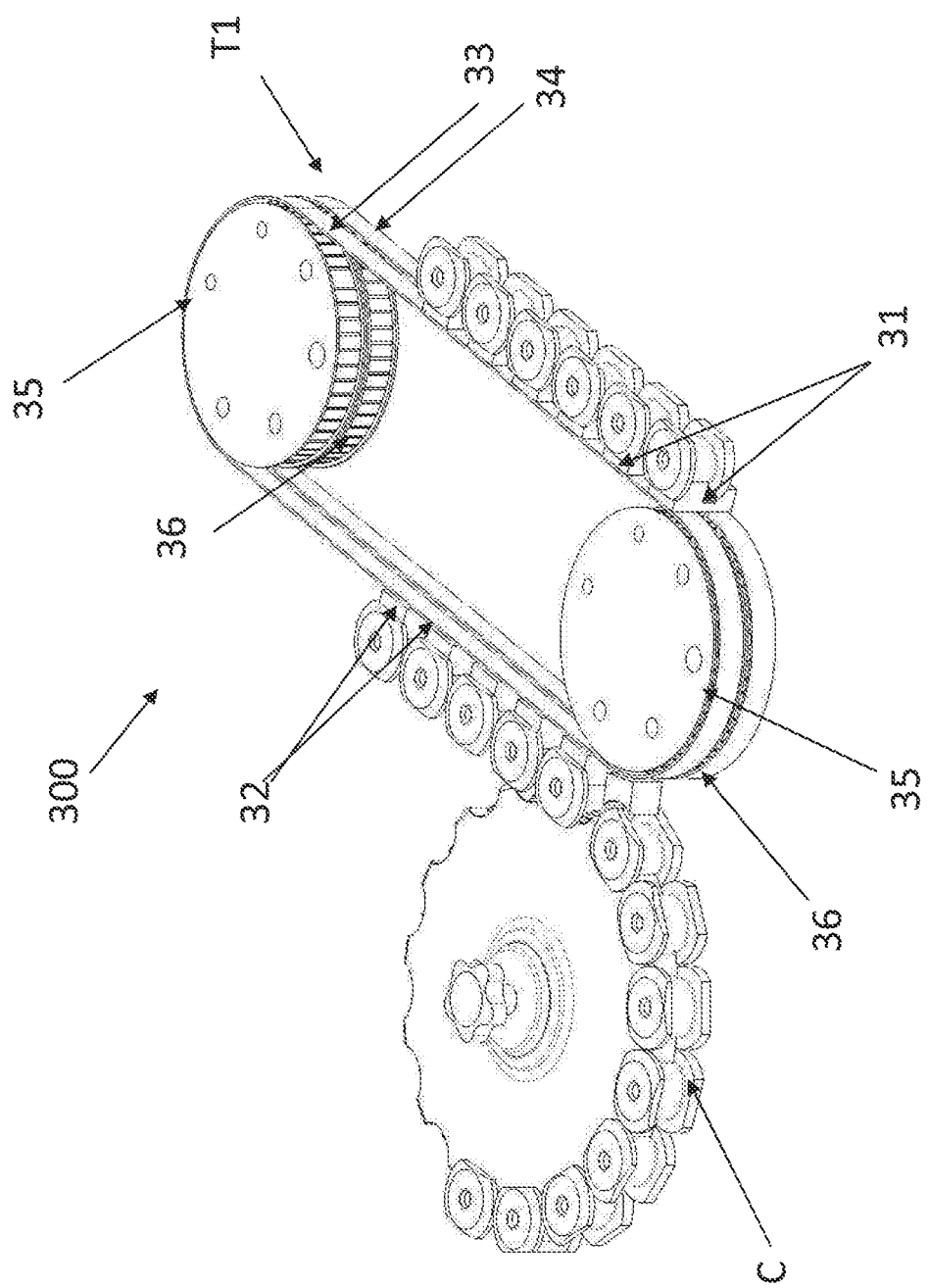
Figure 20:
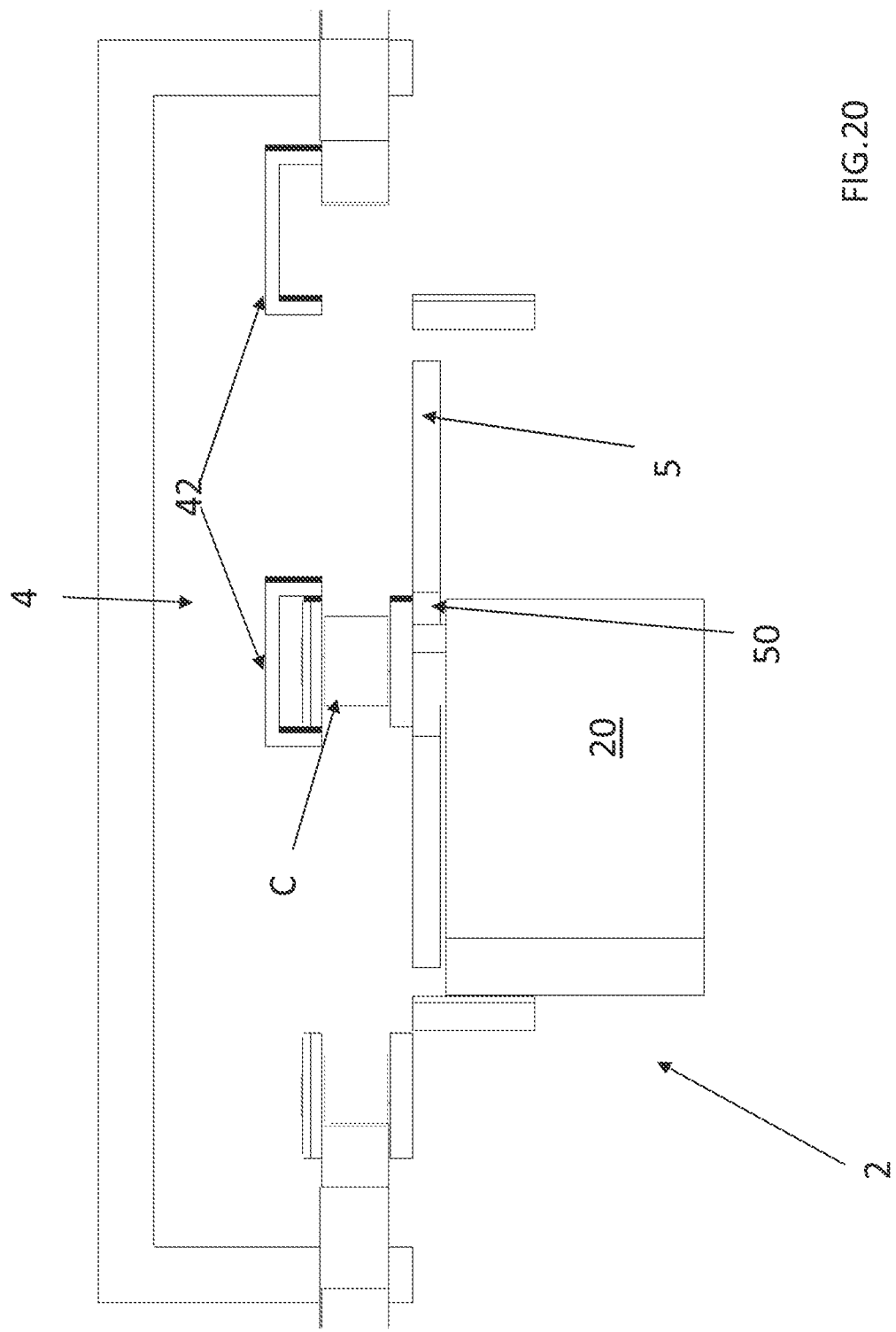
FIGS. 20-22 are three enlarged cross sections of the weighing station of the system of the invention, corresponding to three different operating situations, according to the embodiment illustrated in FIGS. 1-17.
Figure 21:
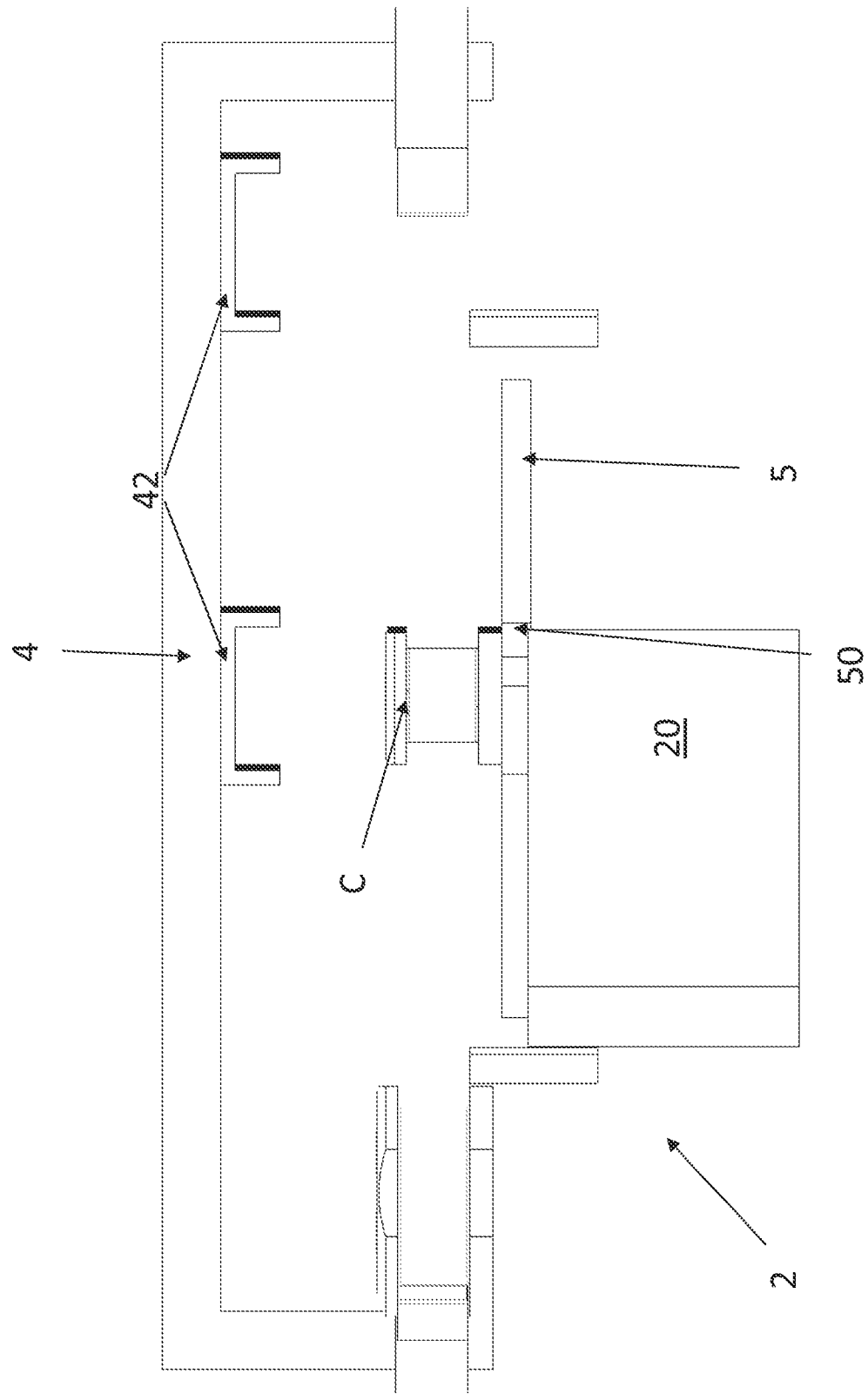
Figure 22:
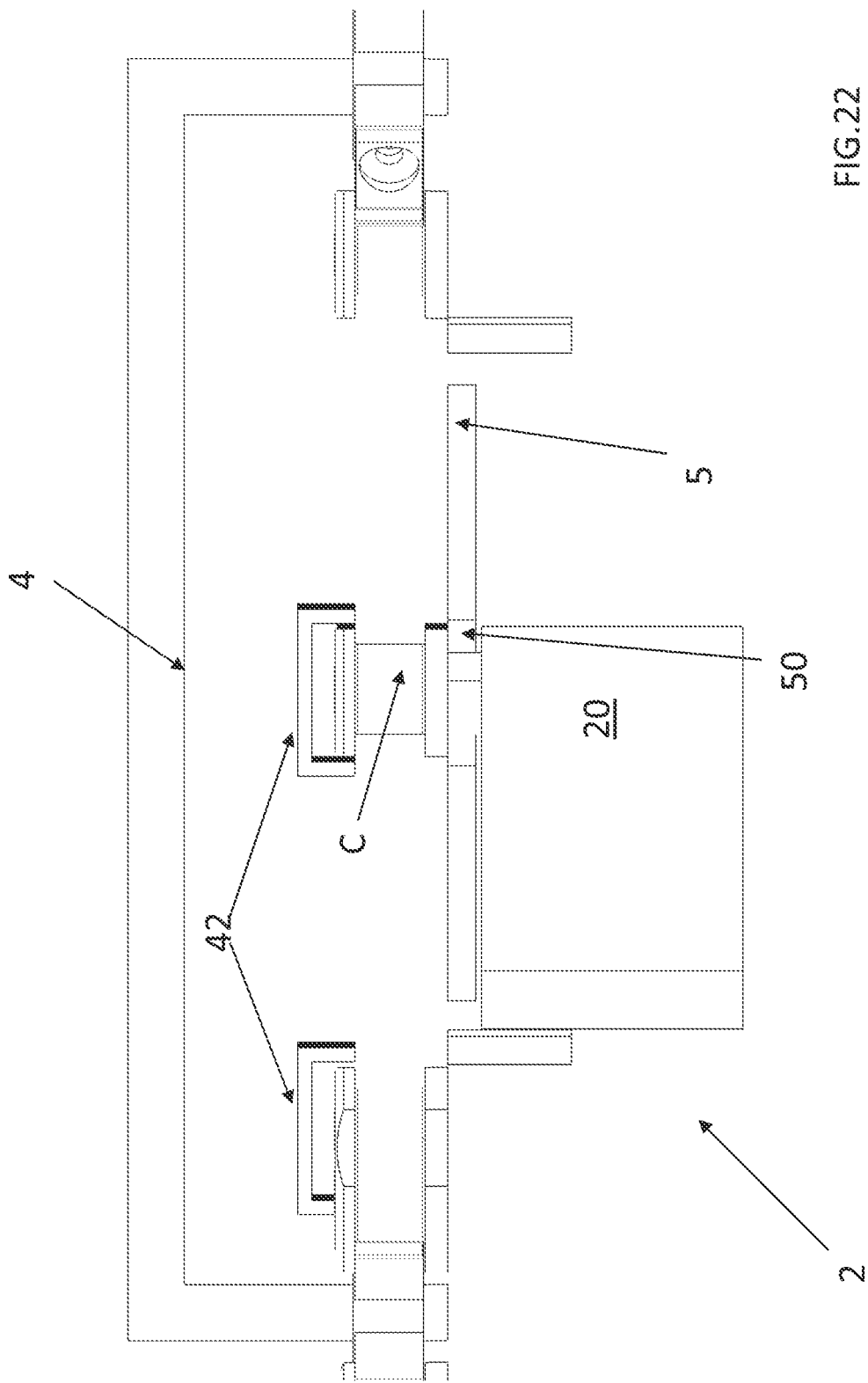

It is noted that the second conveying unit 400 is not fully illustrated because it is the same as the first conveying unit 300 which is, instead, illustrated FIGS. 18 and 19, commented above.

Now described briefly below is the operation of the system 1 according to the embodiment described above and illustrated in FIGS. 1-17.

Similarly to what is described above for the embodiment illustrated in FIGS. 23-25, the containers C, transported for example by means of buckets are fed by the infeed section I to the gripping stretch T1 of the conveying path P for example by means of a star wheel feeder which releases a first group of containers C into the first group of housings 31 (see FIG. 2 or 3, for example) which may advance towards the gripping stretch T1.

Figure 4:
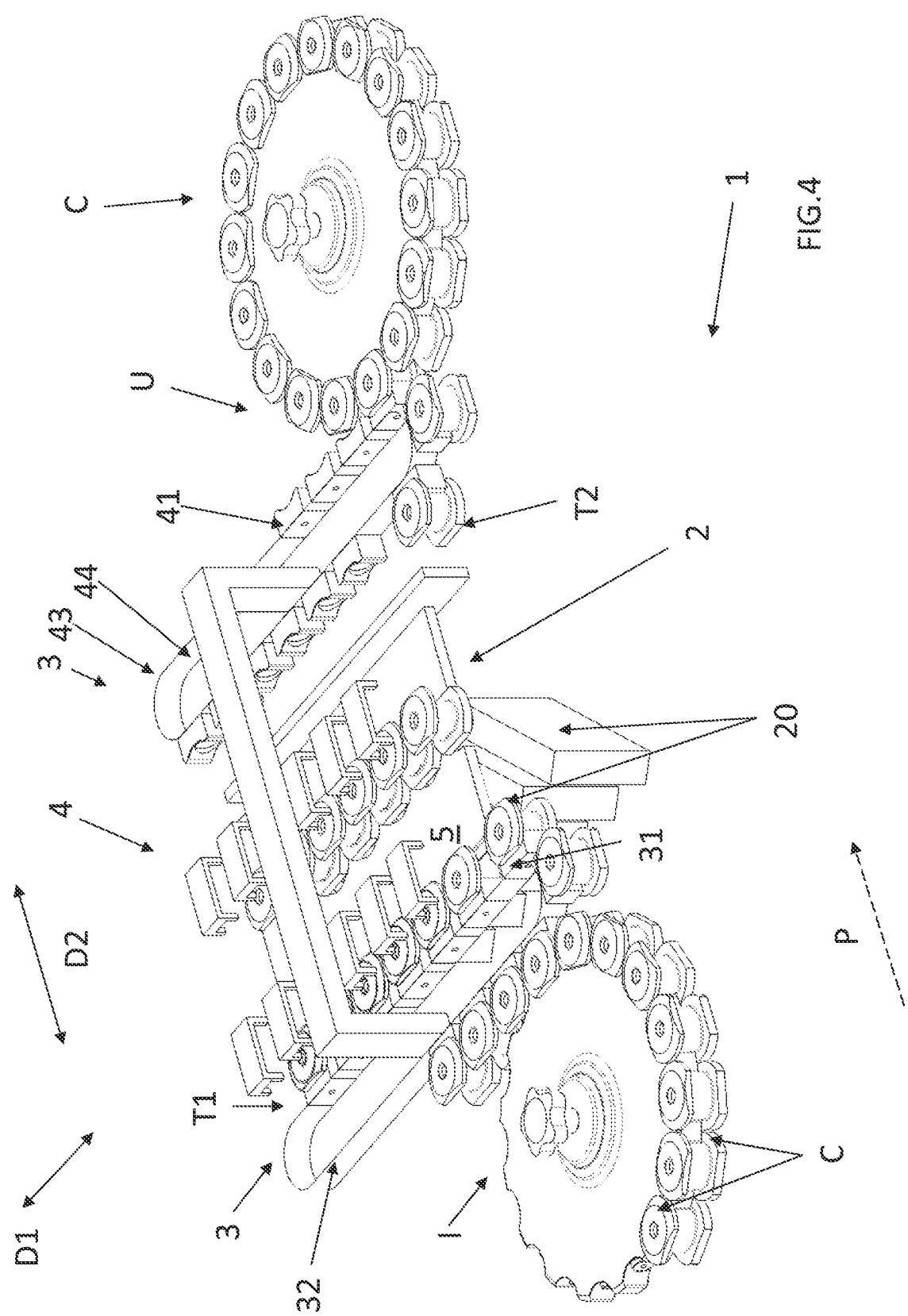
FIG. 4 is a view similar to that of FIG. 1 but in a different operating situation.
Figure 5:
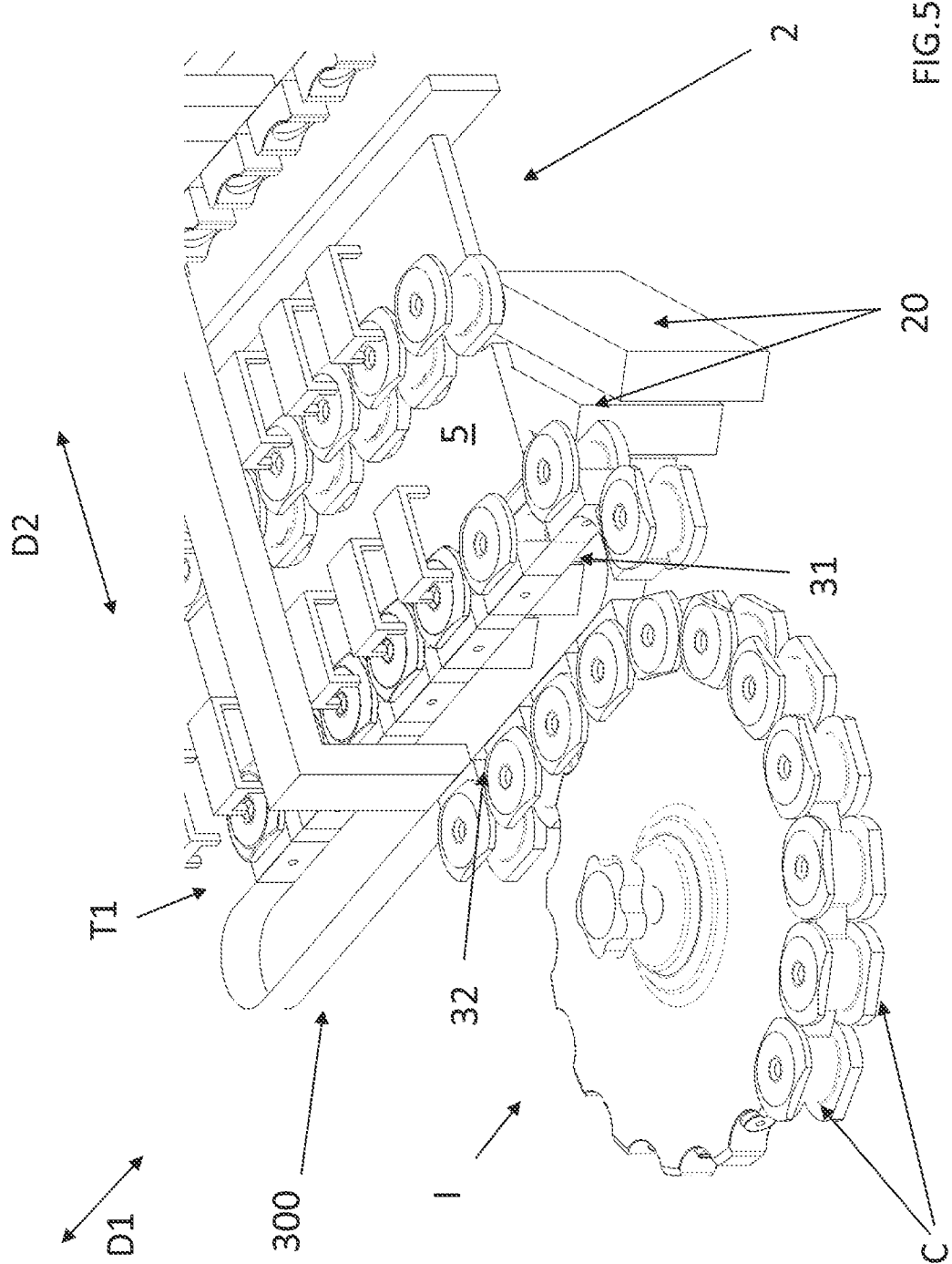
FIG. 5 is an enlarged view of a detail from FIG. 4.
Figure 6:
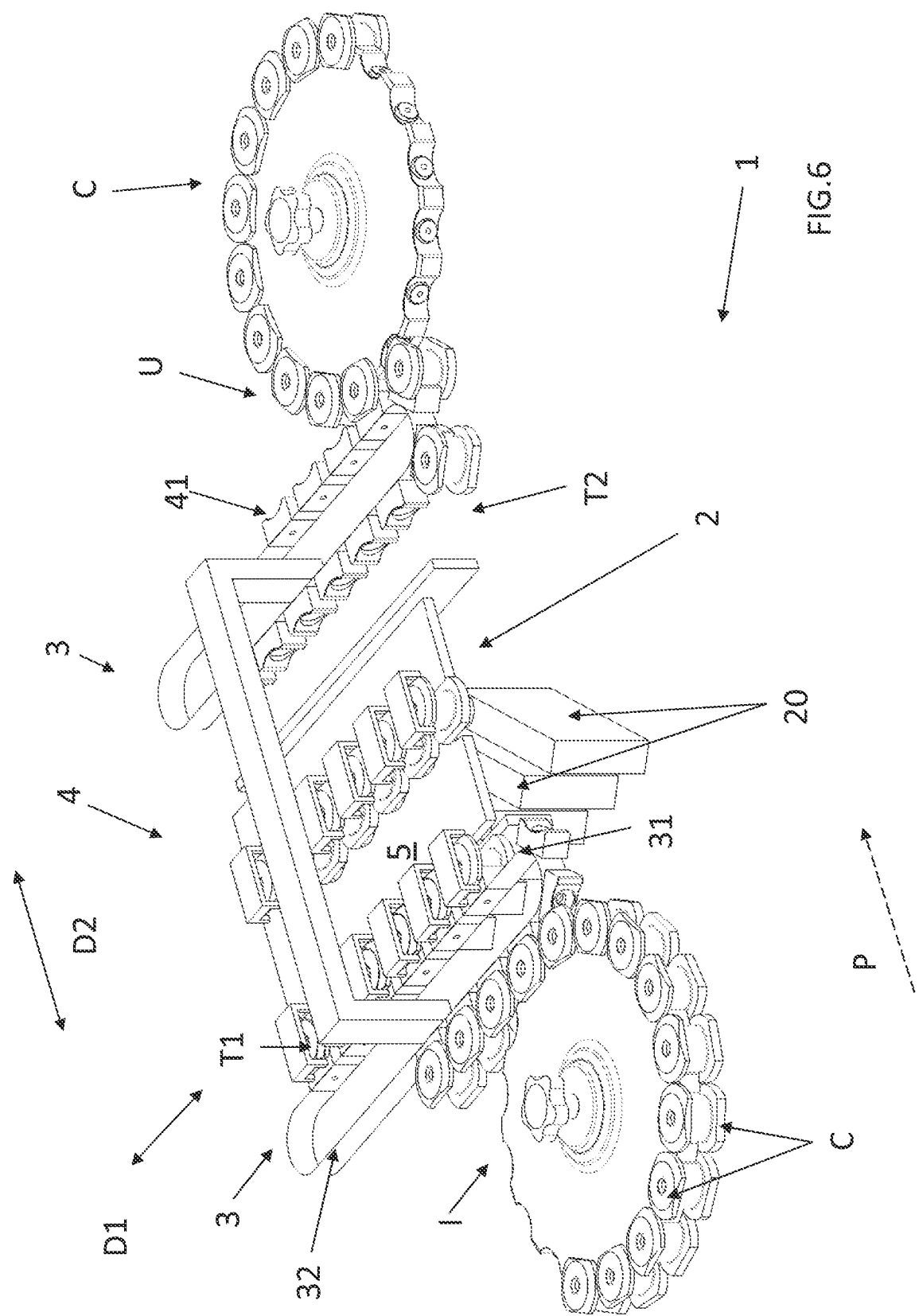
FIG. 6 is a view similar to that of FIG. 1 but in a different operating situation.
Figure 7:
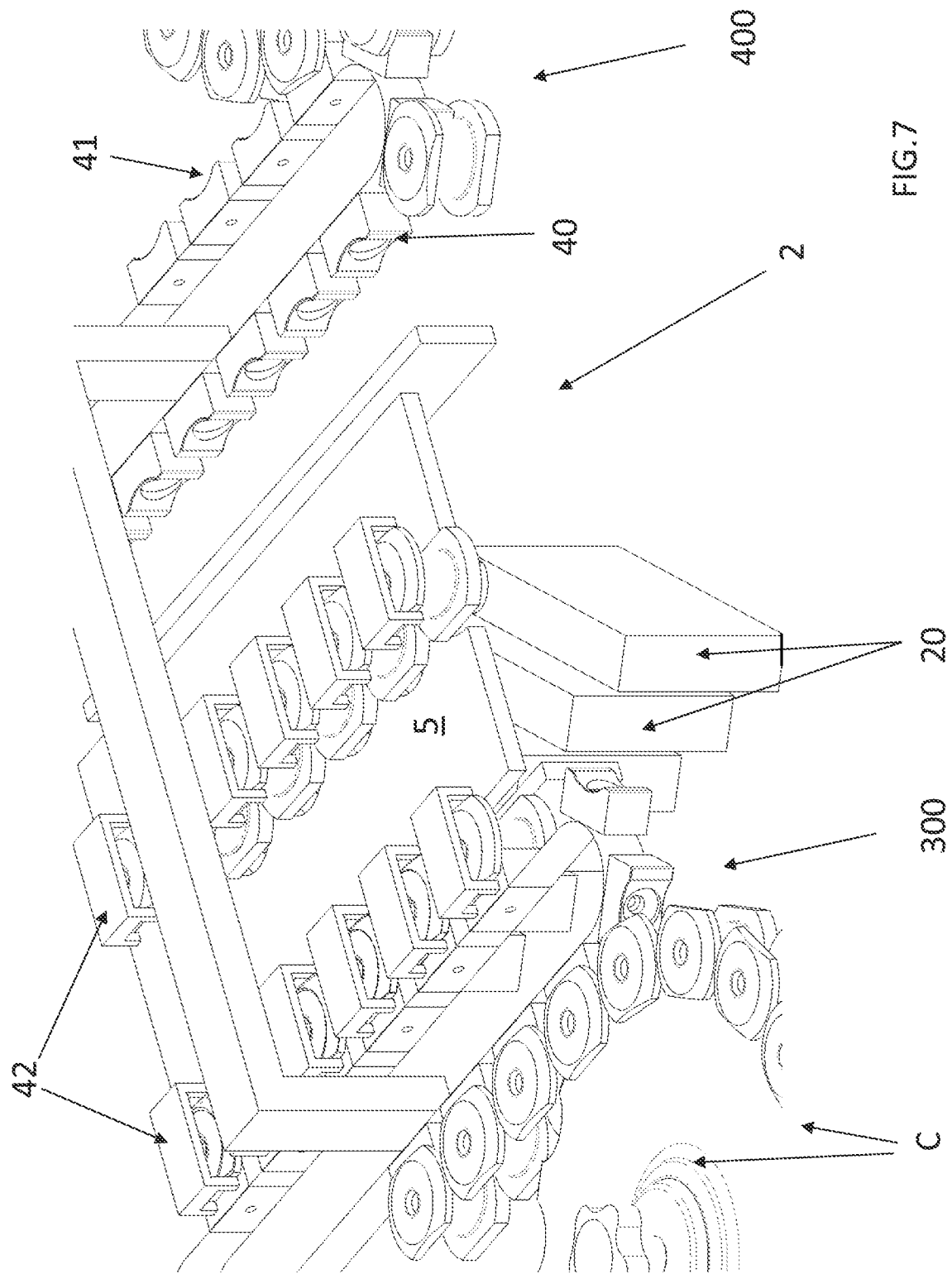
FIG. 7 is an enlarged view of a detail from FIG. 6.
Figure 8:
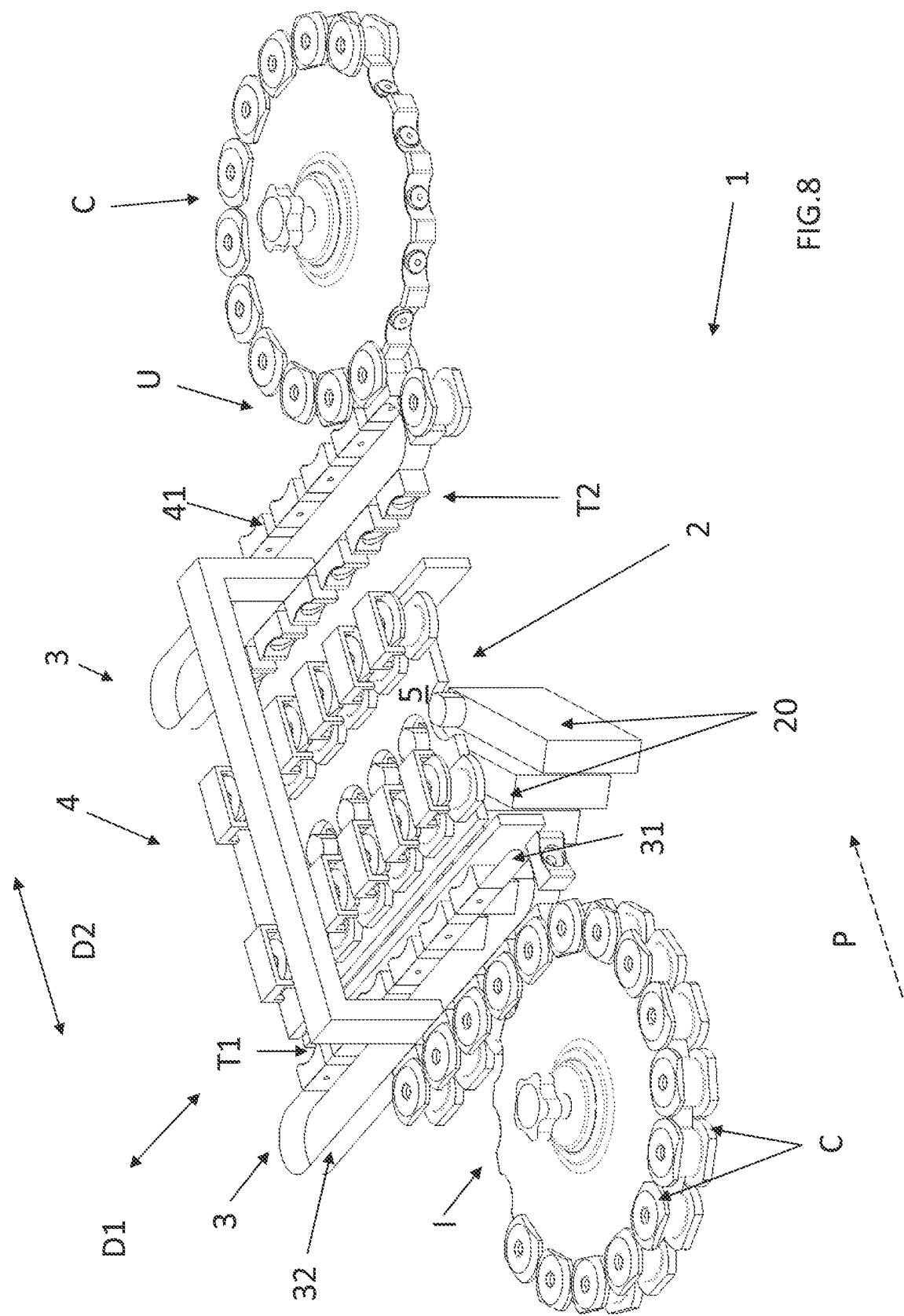
FIG. 8 is a view similar to that of FIG. 1 but in a different operating situation.
Figure 9:
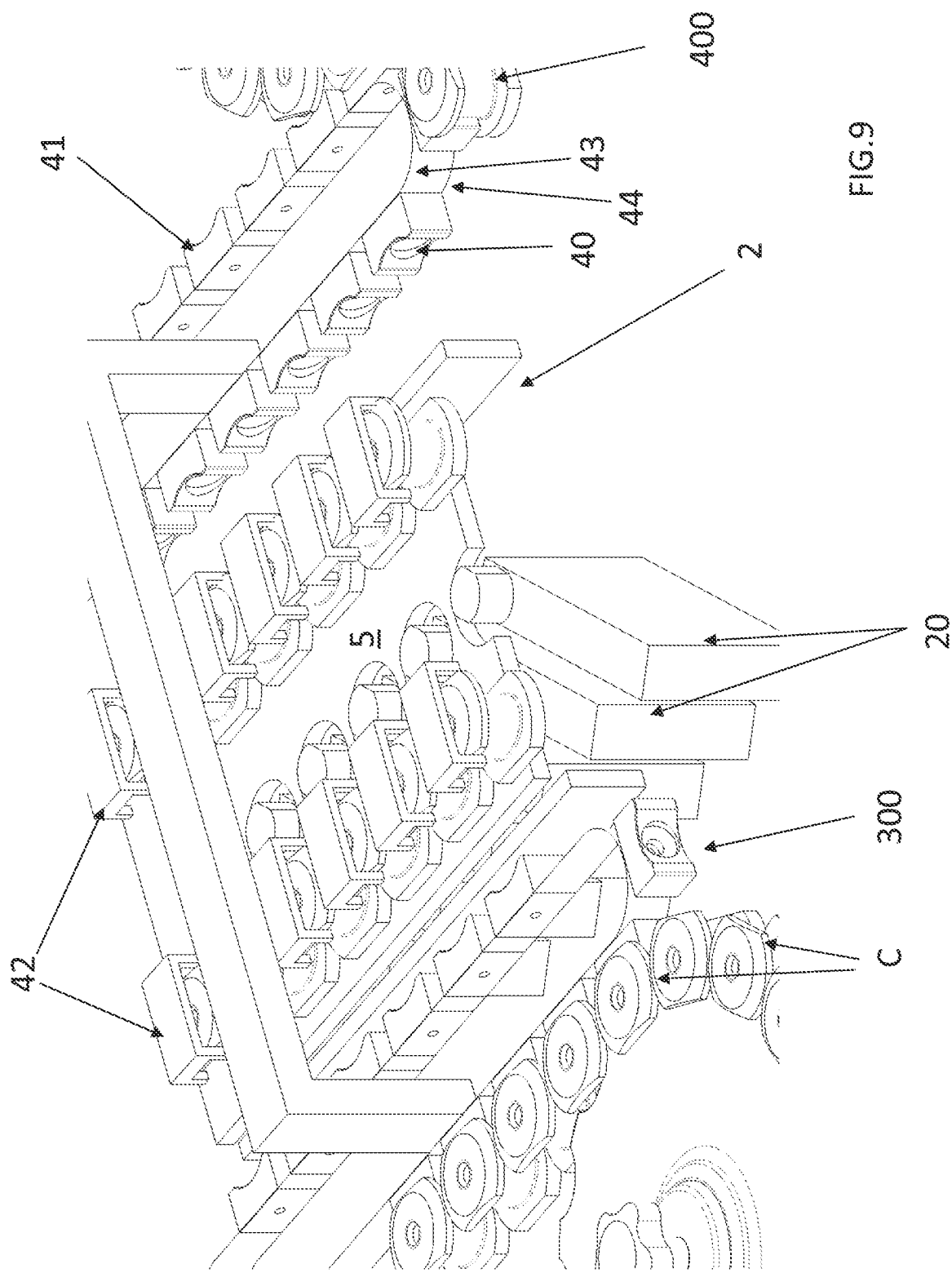
FIG. 9 is an enlarged view of a detail from FIG. 8.
Figure 10:
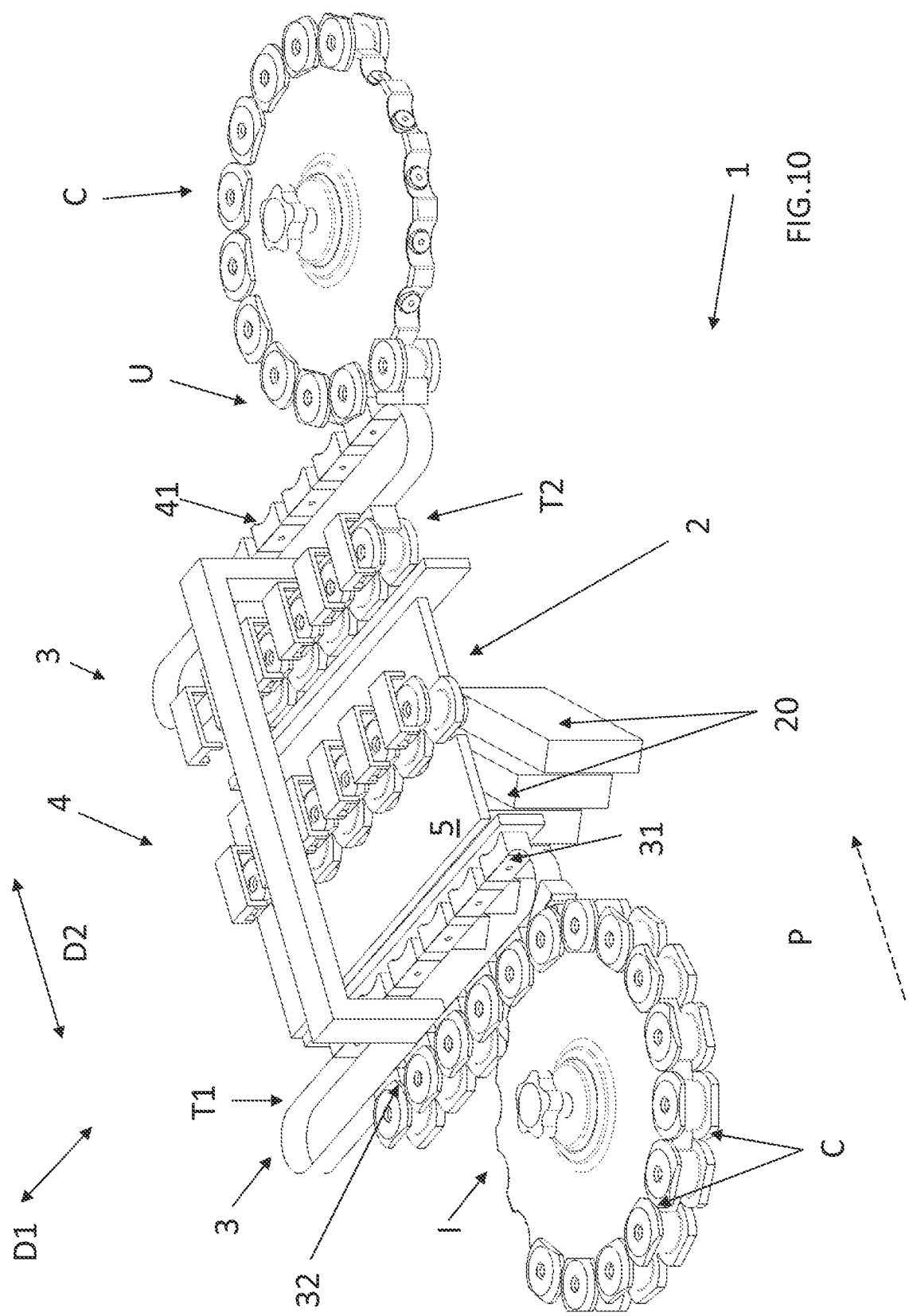
FIG. 10 and FIG. 11 are both views similar to the view of FIG. 1 but in different operating situations.
Figure 11:
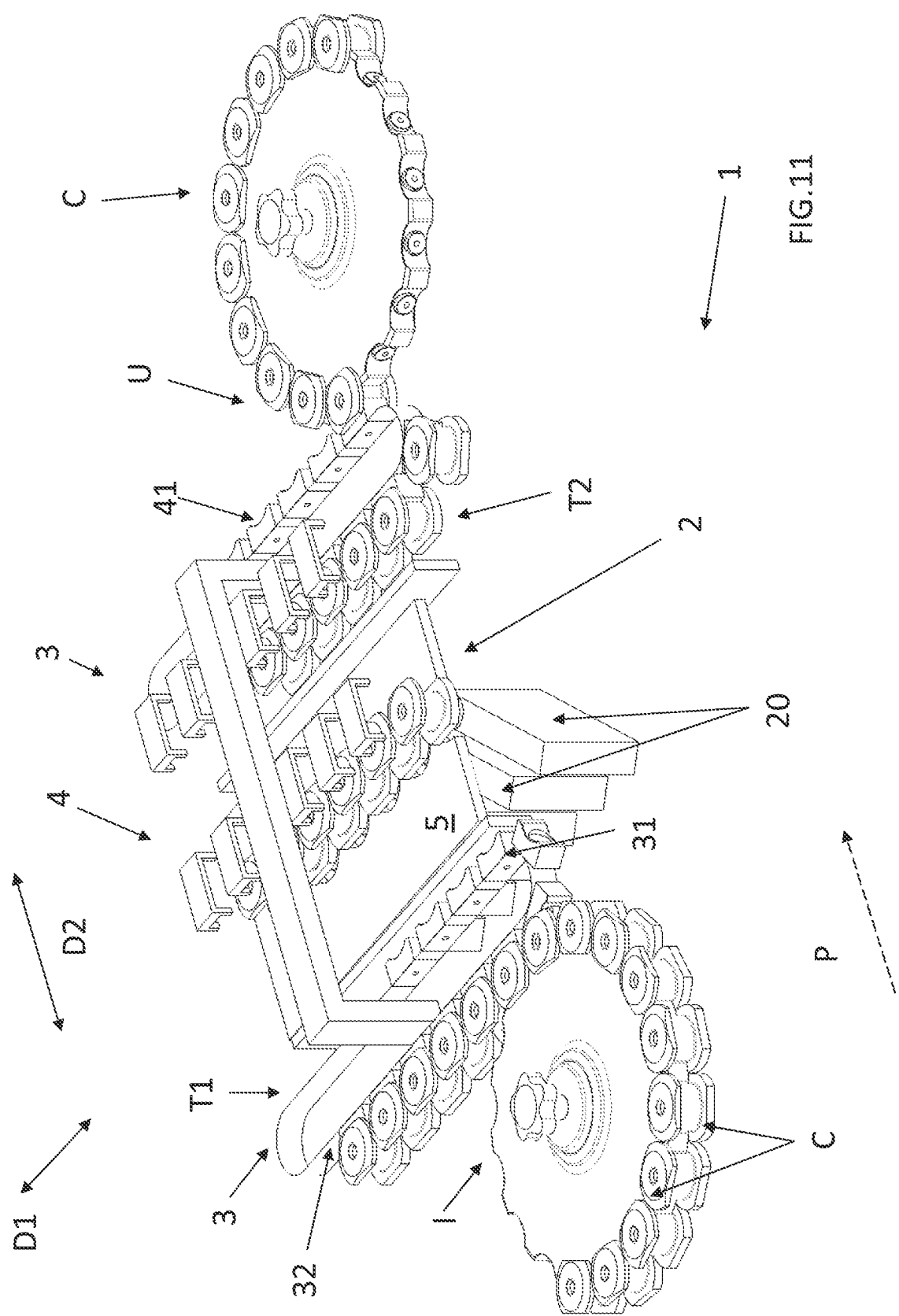
Figure 12:
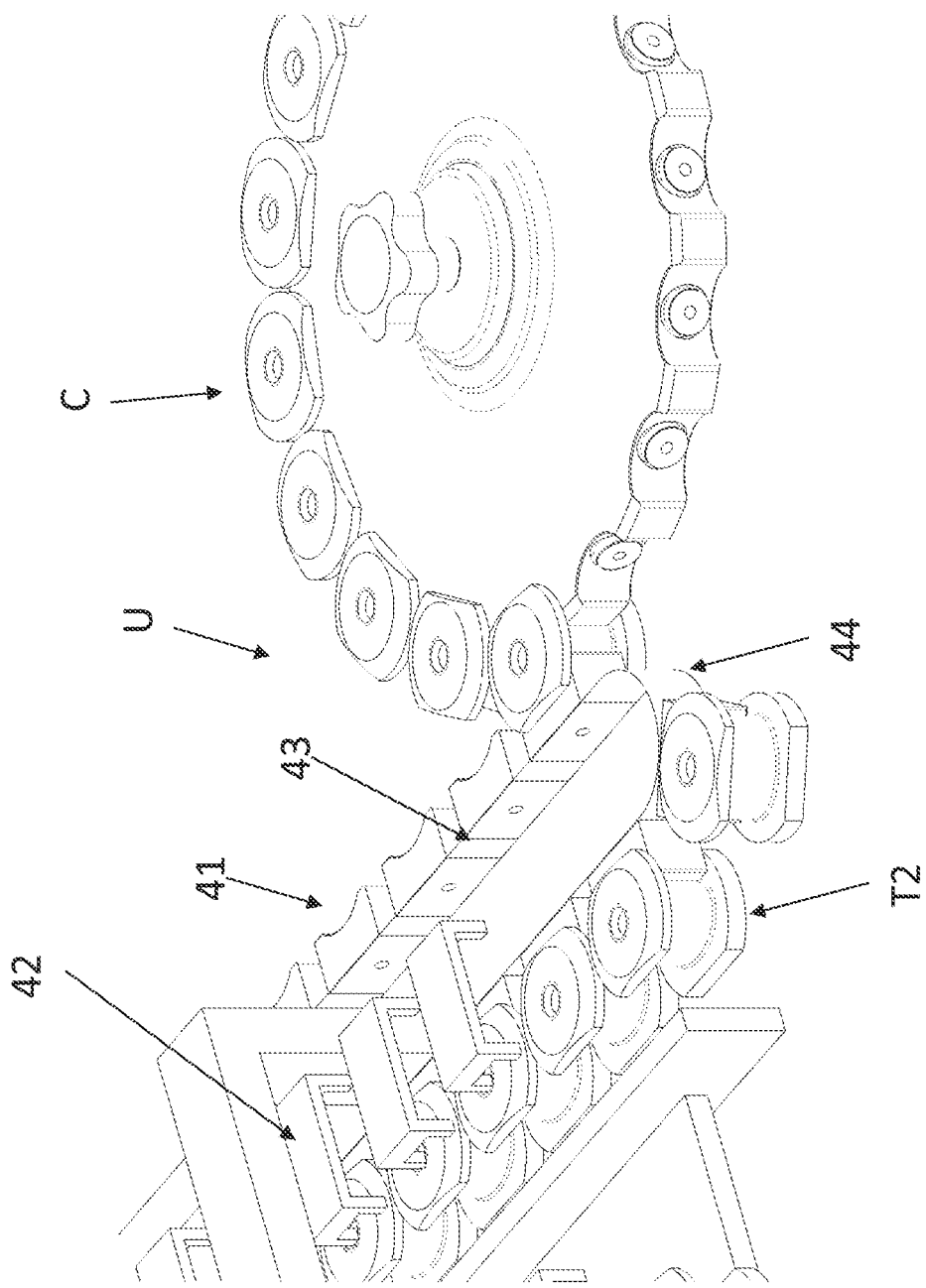
FIG. 12 is an enlarged view of a detail from FIG. 11.
Figure 13:
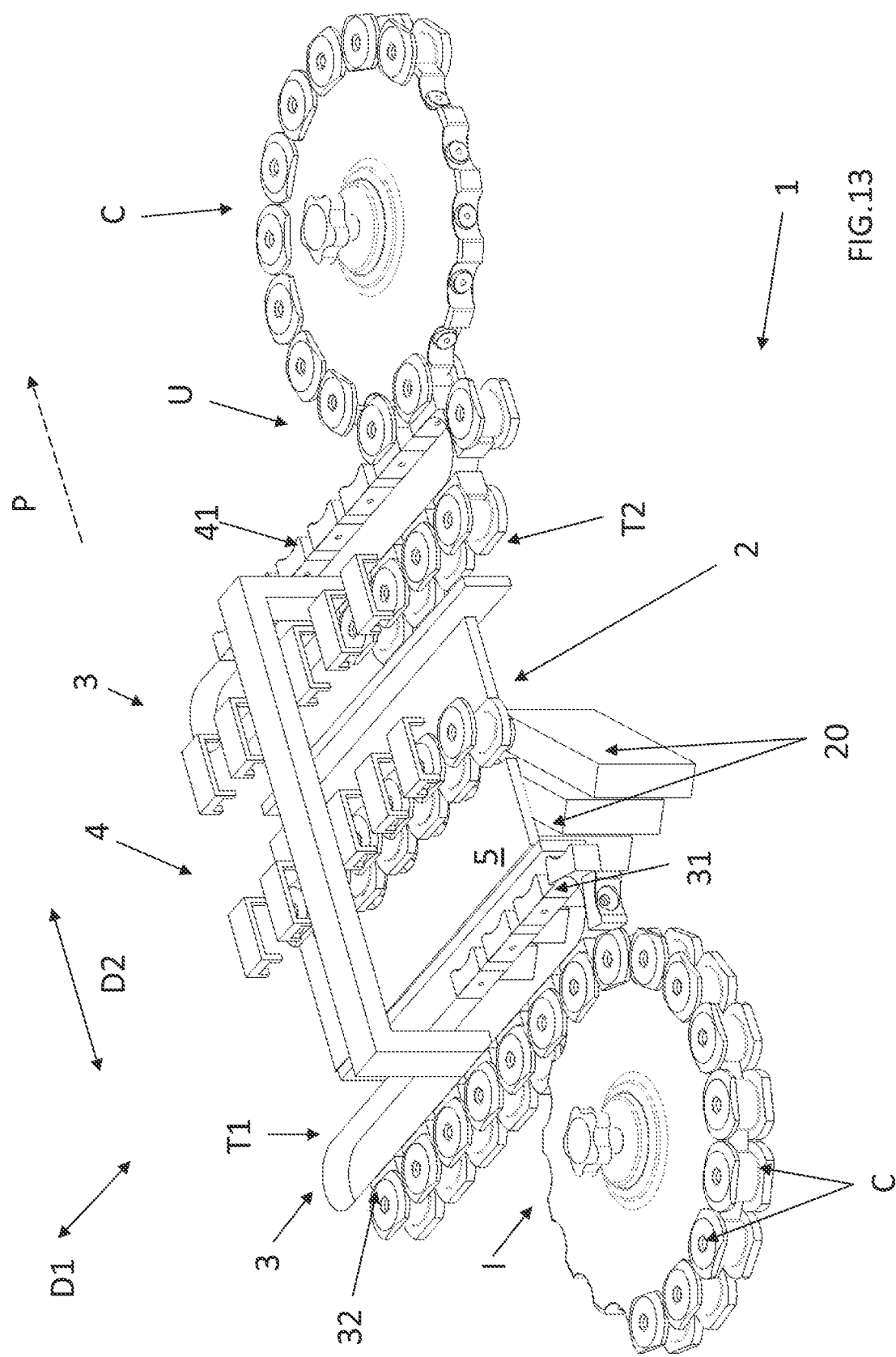
FIG. 13 is a view similar to that of FIG. 1 but in a different operating situation.
Figure 14:
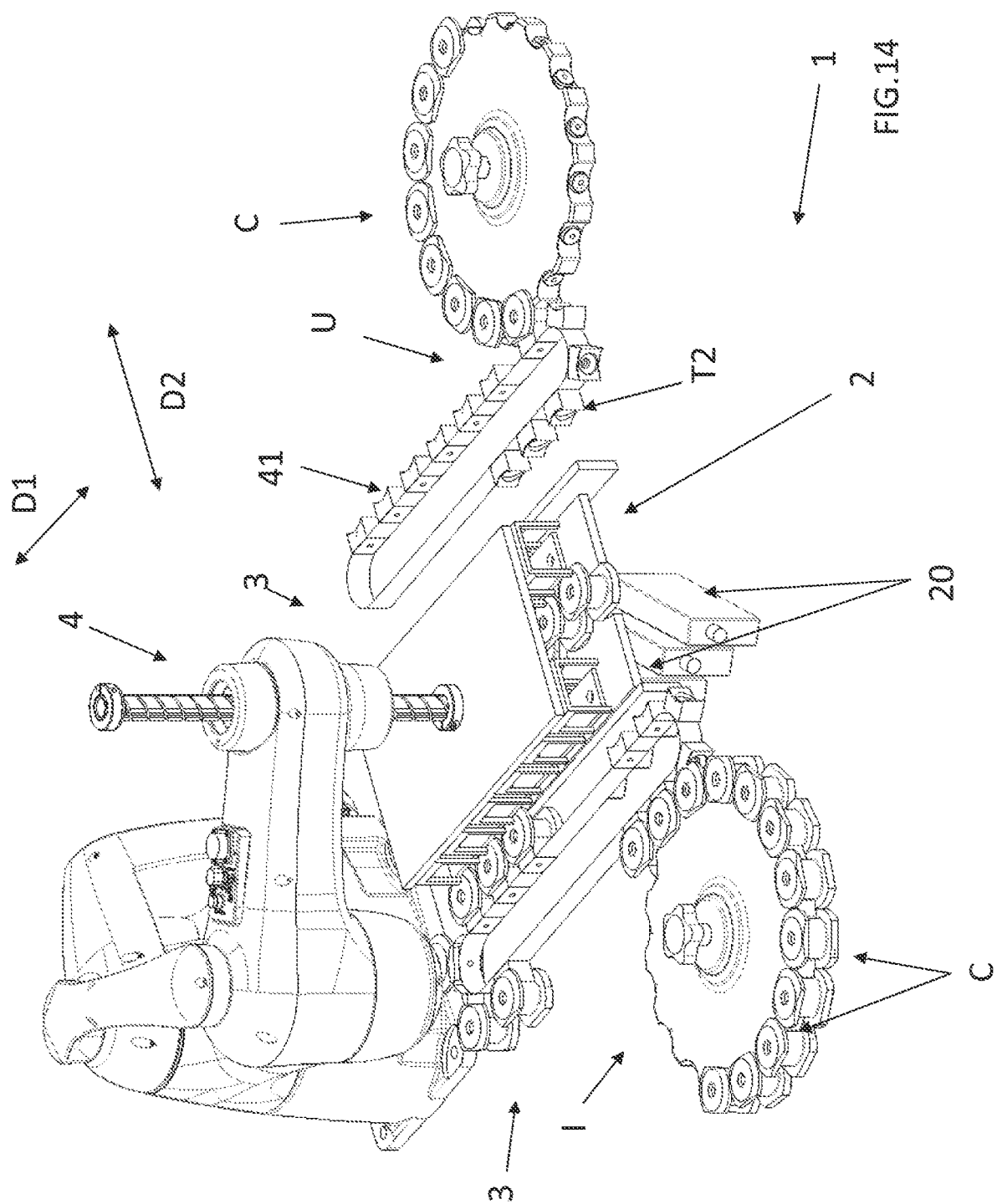
FIGS. 14, 15 and 16 are views similar to the views of FIGS. 1, 6 and 8, respectively, and show a variant thereof.
Figure 15:
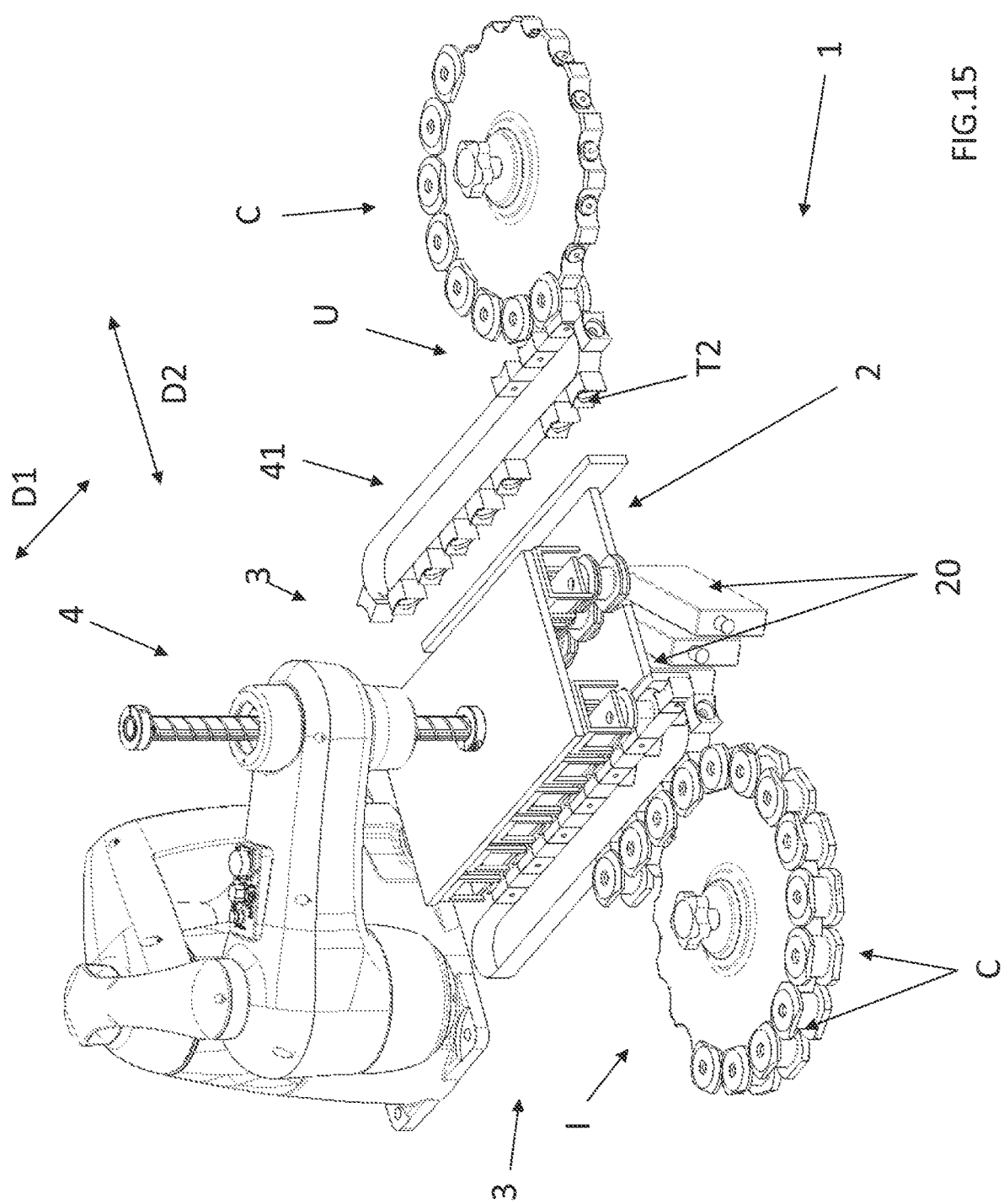
Figure 16:
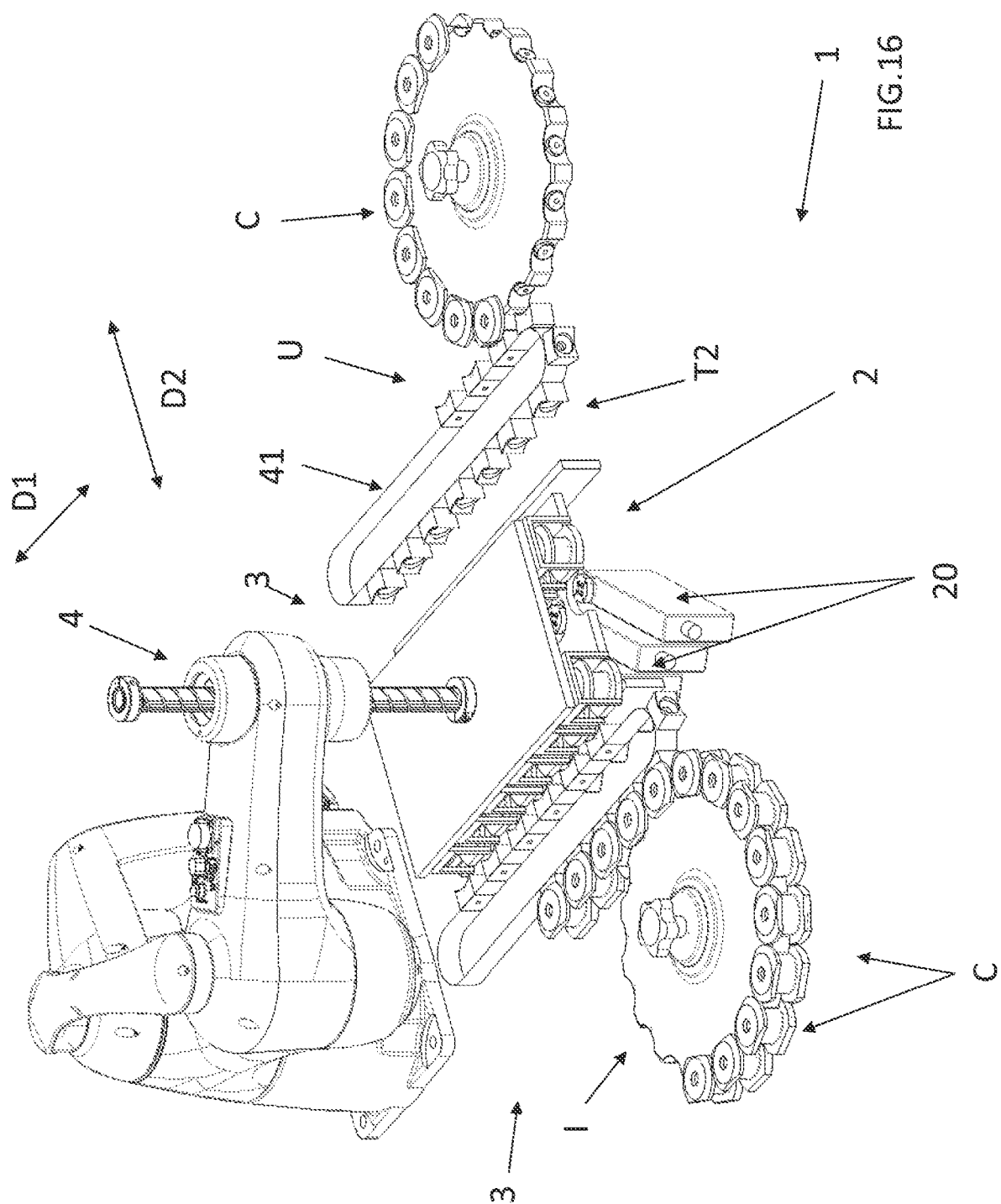
Figure 17:
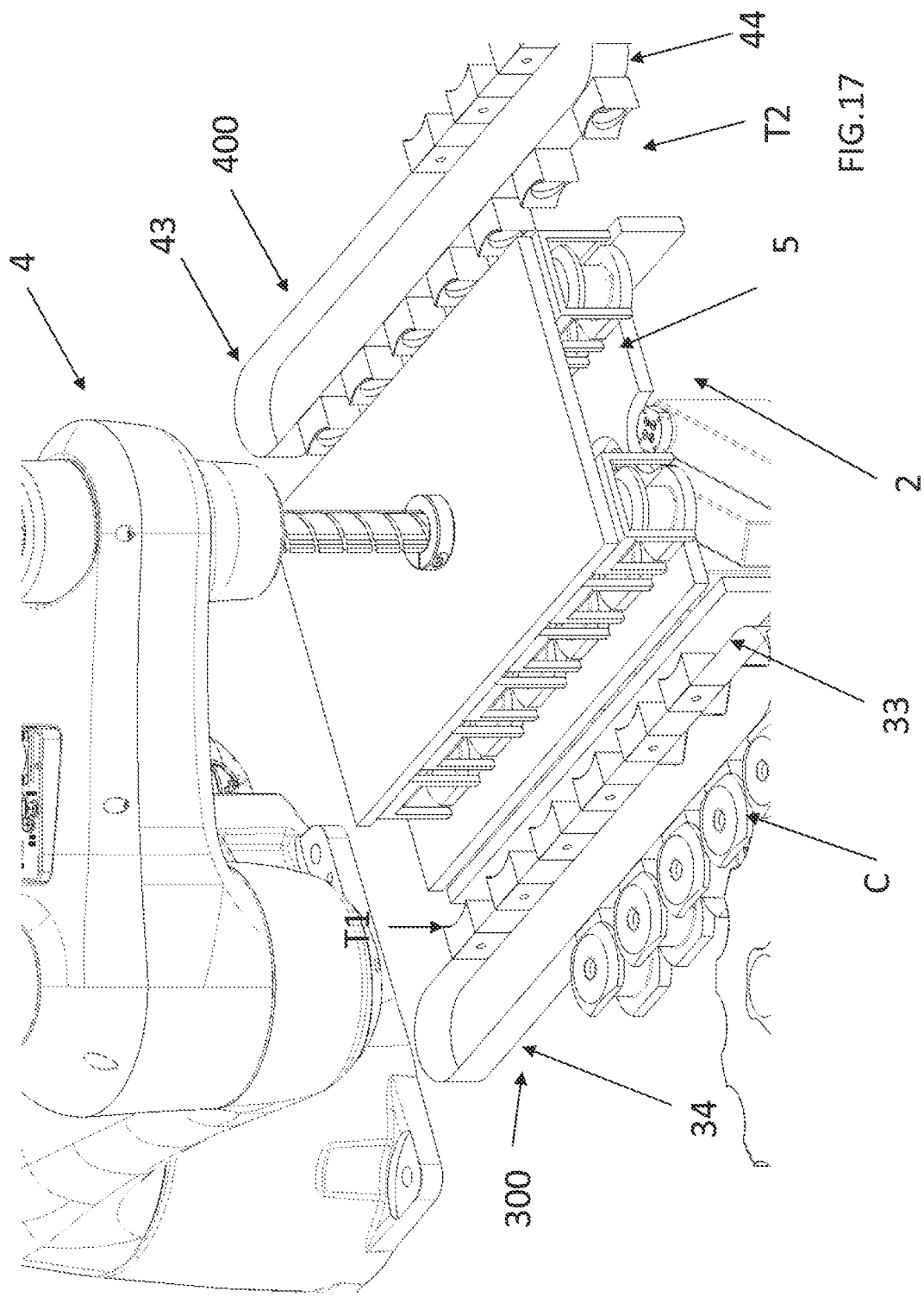
FIG. 17 is an enlarged view of a detail from FIG. 16.

Next, the first group of housings 31 is moved to the gripping stretch T1, where the respective containers C are: all picked up simultaneously by the gripping and transferring means 4 see FIGS. 4-6, for example) (which, in this case, comprise two rows of upturned U-shaped gripper elements 42); placed on the scales 20 and all weighed simultaneously (by moving the supporting surface 5, as described above). In the meantime, the second group of housings 32 has been moved to the gripping stretch T1 together with corresponding containers C.

While the containers C in the second group of housings 32 are all picked up simultaneously by the gripper elements 42 which form a row, the containers C on the scales 20 are all picked up simultaneously by the other row of gripper elements 42 and released onto the release stretch T2, where they are received by the third group of housings 40 which carries the containers C towards the outfeed section U.

At the same time, the fourth group of housings 41 moves to the release stretch T2 to receive the containers C which have just been weighed.

Each group of housings (first 31, second 32, third 40 and fourth 41) may include any number of housings, depending on requirements.

Obviously, there may be more groups of housings in addition to those mentioned above.

Each housing 31, 32, 40, 41 may comprise, for example, a suction cup capable of holding the container while it is being conveyed. Alternatively, or in combination with what has just been said, the correct position of the containers C in the respective housings may be guaranteed by other means such as, for example, grippers/fingers or specially shaped walls/panels.

With reference to the accompanying drawings, each housing is shaped to match the part of the container C it has to receive; in this specific case, it defines a rounded housing.

Alternatively to the system 1 for moving the containers C with two belts, as described above, a variant not illustrated might comprise a conveyor (or more than one conveyor) with independent carriers (that is, housings) driven by a linear motor.

For example, the gripping and transferring means 4 may be of the pick and place type and may comprise a robot linked to the gripper elements 42 (which, in the accompanying drawings are in the shape of an upturned U. Refer in particular to FIGS. 14-17.

Alternatively to what is stated above, the gripping and transferring means 4 may comprise a linkage mechanism (not illustrated) with two degrees of freedom, which carries gripper elements 42 (for example in the shape of an upturned U, as in FIGS. 1-4, described in more detail below) and which allows gripping and moving the containers C as described above.

With reference in particular to FIGS. 1-17 and 20-22 and as mentioned above, the gripping and transferring means 4 comprise two parallel rows of gripper elements 42 that are connected and suitably spaced apart: that way, with a single movement, it is possible to move the containers C, already weighed on the scales 20, onto the release stretch T2, and the containers C, on gripping stretch T1, still to be weighed, onto the scales 20 (in place of those picked up). Advantageously, the total times of the system 1 are thus optimized. More in detail, the number of gripper elements 42 is at least equal to the maximum number of containers C in the first group of housings 31 or in the second group of housings 32, each used to pick up and transfer only one container C. That way, all the containers C can be transferred simultaneously from the housings 31, 32 on the gripping stretch T1 to the weighing station 2 (and then to the transfer stretch T2). The gripping and transferring means 4 illustrated in the drawings move with a reciprocating, to-and-fro movement along two opposing orientations: one (substantially vertical) to pick up and release the containers C (in two opposite directions) and the other (substantially horizontal) to transport the containers C picked up and, after releasing the latter, to move back to the gripping position (hence in two opposite directions).

This invention also relates to a system 1 (illustrated in FIGS. 26 and 27) for weighing containers C, different from the system described above, but linked to the same inventive concept (as explained in more detail below). With regard to the containers C, what is stated above obviously applies.

The system 1' for weighing containers C comprises: a weighing station 2' for weighing containers C, a conveying path P' of the containers C, extending from an infeed section I', upstream of the weighing station 2', to an outfeed section U', downstream of the weighing station 2'.

The conveying path P' also comprises a gripping stretch T1' for gripping the containers C and a release stretch T2' for releasing the containers C, which are interposed between the infeed section I' and the outfeed section U'.

The system 1' also comprises conveying means 3', disposed along the conveying path P' for conveying the containers C to be weighed from the infeed section I' to the gripping stretch T1', and the weighed containers C from the release stretch T2' to the outfeed section U'.

The conveying means 3' comprise at least a first group of housings 31' and a second group of housings 32', adapted to receive the containers C and movable along the conveying path P' from the infeed section I' to the gripping section T1'.

The system 1' further comprises gripping and transferring means 4' for transferring the containers C to be weighed from the gripping stretch T1' (where the containers C are disposed inside the first and second housings 31' and 32') to the weighing station 2', and the weighed containers C from the weighing station 2' to the release stretch T2' of the conveying path P'.

The gripping stretch T1' and the release stretch T2' of the conveying path P' thus correspond to those points where the containers C are respectively picked up from, and released onto, the conveying means 3'. With reference to the drawings, the gripping stretch T1' and the release stretch T2' of the conveying path P' are parallel to each other and the conveying means 3' extend from them.

More specifically, the first group of housings 31' and the second group of housings 32' of the conveying means 3' are connected to each other and arranged in a row; moved along the conveying path P' at a first speed from the infeed section I' towards the gripping stretch T1', and at a second speed, lower than the first speed (and preferably zero), when they are at the gripping stretch T1', to allow the gripping and transferring means 4' to grip the containers C.

Advantageously, unlike the prior art, the system 1' according to the invention (as already stated for the system 1) guarantees weighing all the containers C moving along the conveying path P' and not just some of them. In effect, the fact that the first group of housings 31' and the second group of housings 32' are linked to each other and arranged in a row and movable at a first speed from the infeed section I' to the gripping stretch T1', and at a second speed, lower than the first speed, when they are at the gripping stretch T1', means that while the containers C disposed at one of the two groups of housings are picked up by the gripping and transferring means 4' and weighed, other containers C are conveyed by the other group of housings along the conveying path P' at a higher speed without affecting the productivity of the machine.

In other words, the system 1' configured this way allows introducing "pauses" which affect only the containers C which are on the gripping stretch T1' to be picked up at that moment and then weighed, without affecting the rest of the system 1'. In effect, it would not otherwise be possible to weigh all the containers C without stopping the machine, which would negatively affect the overall productivity of the system 1'.

In the preferred embodiment, when the first group of housings 31' is at the gripping stretch T1', the gripping and transferring means 4' (pick up and) transfer simultaneously all the containers inside the first group of housings 31' to the weighing station 2'; similarly, when the second group of housings 32' is at the gripping stretch T1', the gripping and transferring means 4' (pick up and) transfer simultaneously all the containers inside the second group of housings 32 to the weighing station 2.

Advantageously, the fact that the gripping and transferring means 4' simultaneously transfer to the weighing station 2' a plurality of containers C (that is, those in the first group of housings 31' and in the second group of housings 32') means that the containers C can all be conveyed along the conveying path P and all weighed very quickly. In other words, there is a guarantee that all the containers C (and not just a statistical "random sample" of them) are weighed rapidly.

Conveyors of the star wheel type (as illustrated in the accompanying drawings) may be mounted at the infeed section I' and at the outfeed section U' of the conveying path P'. Alternatively, different devices used for this purpose may obviously also be provided. These conveyors move continuously to feed the containers C towards and away from the housings at a constant speed.

As shown in the drawings which illustrate this embodiment, and as described above for the preceding embodiment, each housing of the first group of housings 31' and of the second group of housings 32' receives only one container C.

Again with reference to the drawings which illustrate this embodiment, the number of housings of the first group of housings 31' coincides with the number of housings of the second group of housings 32' but, alternatively, the number of housings of the first group of housings 31' might be different from the number of housings of the second group of housings 32'.

Again with reference to FIGS. 26 and 27, the conveying means 3' further comprise a belt 403' carrying the first group of housings 31' and the second group of housings 32', two translatory pulleys (303', 304'), around which the belt 403' is looped and movement means, to allow the two translatory pulleys 303', 304' to be moved along an orientation of translation Y' parallel to their centre-to-centre line (in two opposite directions).

In practice, the belt 403' moves around the two translatory pulleys 303', 304' to receive the containers C fed continuously by the infeed section I', for example in the first group of housings 31' until they reach the gripping stretch T1'. Here, the containers C inside the first group of housings 31' must be picked up by the gripping and transferring means 4' and are thus fed at the second speed, preferably at a standstill (that is, their speed is zero). To do this, the belt 403' is no longer moved (driven) directly by the two translatory pulleys 303', 304 but, in order to simultaneously allow other containers C to be fed continuously to the conveying means 3' (for example, in the second group of housings 32') the two translatory pulleys 303', 304' are moved (translated) (for example, by means of a cam not illustrated) along an orientation parallel to the respective centre-to-centre line, in a first direction of translation. This creates a buffer of containers C on the belt 403' without having to interrupt the flow of containers C from the infeed section I'.

Once the containers C which were in the first group of housings 31' have been picked up by the gripping and transferring means 4' to be weighed, the belt 403' resumes its movement under the action of the two translatory pulleys 303', 304' which, at the same, time return to the starting position by moving translationally along an orientation parallel to the respective centre-to-centre line in a second direction of translation (opposite to the first direction of rotation) until the containers C in the second group of housings 32' reach the gripping stretch T1'.

In other words, the path of the containers C between the infeed section I' and the gripping stretch T1' is a variable path defined by the translation of the two translatory pulleys 303', 304' to and fro along an orientation of translation Y' parallel to the respective centre-to-centre line.

The embodiment illustrated in FIGS. 26 and 27 provides a system very similar to the one just described for transferring the weighed containers from the release stretch T2' to the outfeed section U'.

More specifically, there is another pair of translatory pulleys 305', 306' which can move translationally in the same way as described above in connection with the pair of translatory pulleys 303', 304. There is also another belt 404' looped around the other translatory pulleys 305', 306', a third group of housings 40' and a fourth group of housings 41' carried by the belt 404'.

In the embodiment illustrated in FIGS. 26 and 27, the weighing station 2' is disposed along the conveying path P' of the containers C in the same way as described above in connection with the embodiment illustrated in FIGS. 1-17. For details regarding the weighing station 2', the presence of the supporting surface 5' (and the related drive system) and the gripping and transferring of the containers, the reader is therefore referred to the above description.

In a variant not illustrated, alternative to the this solution, the weighing station 2' might be disposed on the outside of the container conveying path P'. With regard to the operation of the weighing station 2', the number of scales and the gripping and transferring means 4', the reader is referred to what is stated above in connection with the solution illustrated in FIGS. 23-25.

The invention also relates to a machine (not illustrated) for filling and weighing containers C and which comprises: a first system 1, 1' for weighing containers C (according to any one of the embodiments described above), for weighing empty containers (C) to be filled; and a filling station (not illustrated), that receives the empty containers (C), weighed in the first weighing system 1, 1' and filled with a filling product (for example, liquid or powder); and a second system 1, 1' for weighing containers C (according to any one of the embodiments described above), for weighing the containers C filled in the filling station.

The machine also comprises a control unit which is connected to the first weighing system 1, 1' and to the second weighing system 1, 1' and which, for each container C, calculates the weight of the product placed therein (by calculating the difference between the weight of the full container C and the weight of the empty container C) and hence, the amount of product filled into the containers C.

Furthermore, for each container C, the control unit compares the calculated product weight with a reference value which, for example, is stored in an internal memory of the control unit itself. If the calculated value is different from the reference value (plus or minus a given tolerance, if necessary), the container C is rejected at a specific point of the machine.

The invention also relates to a method for weighing containers C, comprising the following steps:
  conveying a plurality of containers C along a conveying path P, from an infeed section I towards a gripping stretch T1 of the path;
  gripping the containers C at the gripping stretch T1 of the path and transferring them to a weighing station 2;
  weighing the containers C;
  after weighing the containers C, gripping the containers C and transferring them to a release stretch T2 of the conveying path (P);
  conveying the containers C towards an outfeed section U.

In particular, during the conveying of the containers C from the infeed section I to the gripping stretch T1, at least a first group and a second group of containers C are conveyed independently of each other.

In the preferred embodiment, the containers C of the first group of containers are all transferred simultaneously from the gripping stretch T1 to the weighing station 2; similarly, the containers C of the second group of containers are all transferred simultaneously from the gripping stretch T1 to the weighing station 2. Preferably, the containers C of the first group of containers are weighed simultaneously (each on a respective scale, as already stated) and the containers C of the second group of containers are weighed simultaneously (each on a respective scale, as already stated).

For example, the method can be implemented using the system 1 described above.

Advantageously, the method according to the invention guarantees weighing all the containers C moving along the conveying path P, unlike the prior art methods. In effect, the fact that a first group of containers C and a second group of containers C are moved independently of each other from the infeed section I to the gripping stretch T1 means that while the first group of containers C is weighed, the other group of containers C is conveyed towards the weighing station 2. In other words, the method allows introducing "pauses" which affect only the containers C being weighed at a particular moment, without affecting the others. In effect, it is known that weighing the containers C requires a certain amount of time and stopping altogether would have a negative effect on the overall productivity.

Preferably, the gripping stretch T1 and the release stretch T2 of the conveying path P are oriented along a first orientation and the containers C are transferred from the gripping stretch T1 to the weighing station 2 and from the weighing station 2 to the release stretch T2 along a second orientation, perpendicular to the first orientation.

Advantageously, that way, as stated above in connection with the system 1, the total productivity times of the system 1 are kept particularly low compared to prior art systems thanks to the fact that the containers C are transferred from the gripping stretch T1 to the weighing station 2 and from the weighing station 2 to the release stretch T2 along a path oriented perpendicularly to the first orientation.

Alternatively, in variants not illustrated, transfer may occur along paths oriented differently, that is to say, not perpendicularly to the first direction.

In one embodiment, during the conveying of the containers C from the release stretch T2 to the outfeed section U, at least a third group and a fourth group of containers C are conveyed independently of each other.

Advantageously, this feature also allows optimizing the operations for weighing the containers C.

Another weighing method of the invention, alternative to the one described above, comprises:
conveying a plurality of containers C along a conveying path P', from an infeed section I' towards a gripping stretch T1' of the path;
gripping the containers C at the gripping stretch T1' of the path and transferring them to a weighing station 2';
weighing the containers C;
after weighing the containers C, gripping the containers C and transferring them to a release stretch T2 of the conveying path P';
conveying the containers C towards an outfeed section U'.

More specifically, the containers C are conveyed at a first speed from the infeed section I' to the gripping stretch T1' and are carried at a second speed, lower than the first speed, when they are at the gripping stretch T1'. Preferably, the second speed is zero.

In the preferred embodiment, the containers C of the first group of containers are all transferred simultaneously from the gripping stretch T1' to the weighing station 2' and the containers C of the second group of containers are all transferred simultaneously from the gripping stretch T1' to the weighing station 2'. Preferably, the containers C of the first group of containers are weighed simultaneously (each on a respective scale, as already stated) and the containers C of the second group of containers are weighed simultaneously (each on a respective scale, as already stated).

This method, too, like the one described above, allows creating "pauses" in order to facilitate weighing of the containers.

The invention also relates to a method for filling and weighing containers C and which comprises, in succession:
a first step of weighing the empty containers C to be filled;
a step of filling the weighed containers C;
a second step of weighing the containers C after they've been filled.
Following the above steps, the method also comprises the steps of:
calculating the weight of the product filled into each container C and hence, the amount of product;
comparing the weight of the product filled into each container C with a reference value; and
if the weight of the product filled into a container C does not coincide with the reference value (plus or minus a given tolerance), rejecting the container C.

The invention claimed is:

1. A system for weighing containers, comprising:
a weighing station for weighing containers;
a conveying path of the containers, extending from an infeed section, upstream of the weighing station, to an outfeed section, downstream of the weighing station; the conveying path further comprising a gripping stretch for gripping the containers and a release stretch for releasing the containers, disposed between the infeed section and the outfeed section;
a conveying system, disposed along the conveying path and comprising a plurality of housings adapted to receive the containers and convey the containers to be weighed from the infeed section to the gripping stretch, and the weighed containers from the release stretch to the outfeed section; the conveying system comprising at least a first group of the housings and a second group of the housings, adapted to receive the containers and move along the conveying path from the infeed section to the gripping stretch;
a gripping and transferring system including a plurality of gripper elements adapted to engage the containers and transfer the containers to be weighed from the gripping stretch to the weighing station, and the weighed containers from the weighing station to the release stretch;
the first group of the housings and the second group of the housings of the conveying system being movable independently of each other from the infeed section to the gripping stretch.

2. The system according to claim 1, wherein the gripping stretch and the release stretch extend along a first orientation; and wherein the gripping and transferring system transfers the containers from the gripping stretch to the weighing station and/or from the weighing station to the release stretch by moving the containers along a second orientation perpendicular to the first orientation.

3. The system according to claim 1, wherein the weighing station comprises a plurality of scales, each scale being used to weigh a container; and wherein the gripping and transferring system transfers each container to be weighed to a corresponding scale.

4. The system according to claim 3, wherein the weighing station further comprises a supporting surface, for supporting the containers during their transfer from the gripping stretch to the scales and from the scales to the release stretch; the supporting surface comprising a plurality of openings, each facing a corresponding scale, the gripping and transferring system releasing the containers to be weighed at the openings in order to engage the openings; the supporting surface being vertically movable between a raised position, above the scales, and a lowered position, at the scales; the openings of the supporting surface and the scales being configured in such a way that when the supporting surface is moved from the raised position to the lowered position, the containers disengage from the openings and come into contact with the scales and are weighed; and when the supporting surface is moved from the lowered position to the raised position, the containers engage the openings again and disengage the scales.

5. The system according to claim 1, wherein the conveying system comprises a first conveying unit in turn comprising: an endless first belt, carrying the first group of the housings; two first pulleys, around which the first belt is looped and which, together with the first belt, move the first group of the housings; an endless second belt, carrying the second group of the housings; two second pulleys, around which the second belt is looped and which, together with the second belt, move the second group of the housings; wherein the two first pulleys and the two second pulleys are movable independently of each other and are mounted respectively in pairs, juxtaposed and coaxial with each other.

6. The system according to claim 5, wherein the conveying system further comprises: at least a third group of the housings and a fourth group of the housings, adapted to receive the containers and movable independently of each other along the conveying path from the release stretch to the outfeed section.

7. The system according to claim 1, wherein the weighing station is disposed externally of the container conveying path, alongside the conveying system; and wherein the container gripping stretch and the container release stretch of the conveying path coincide.

8. The system according to claim 5, wherein the weighing station is positioned along the conveying path of the containers, and is disposed between the gripping stretch and the release stretch of the conveying path.

9. The system according to claim 8, wherein the first conveying unit is positioned upstream of the weighing station; and wherein the conveying system further comprise, downstream of the weighing station:
a second conveying unit in turn comprising an endless third belt, carrying a third group of the housings; and two third pulleys, around which the third belt is looped and which, together with the third belt, move the third group of the housings;
an endless four belt, carrying a fourth group of the housings; and two fourth pulleys, around which the fourth belt is looped and which, together with the fourth belt, move the fourth group of the housings;
the two third pulleys and the two fourth pulleys being movable independently of each other and mounted respectively in pairs, juxtaposed and coaxial with each other.

10. The system according to claim 9, wherein the gripping and transferring system comprises two parallel rows of the gripper elements that are connected and suitably spaced apart to simultaneously transfer, with a single movement, the weighed containers, on the scales, from the weighing station to the release stretch, and the containers, to be weighed, from the gripping stretch to the scales of the weighing station.

11. A system for weighing containers, comprising:
a weighing station for weighing containers;
a conveying path of the containers, extending from an infeed section, upstream of the weighing station, to an outfeed section, downstream of the weighing station; the conveying path further comprising a gripping stretch for gripping the containers and a release stretch for releasing the containers, disposed between the infeed section and the outfeed section;
a conveying system, disposed along the conveying path and comprising a plurality of housings adapted to receive the containers and convey the containers to be weighed from the infeed section to the gripping stretch, and the weighed containers from the release stretch to the outfeed section; the conveying system comprising at least a first group of the housings and a second group of the housings, adapted to receive the containers and move along the conveying path from the infeed section to the gripping stretch;
a gripping and transferring system including a plurality of gripper elements adapted to engage the containers and transfer the containers to be weighed from the gripping stretch to the weighing station, and the weighed containers from the weighing station to the release stretch;
the first group of the housings and the second group of the housings of the conveying system being connected to each other and arranged in a row; to move along the conveying path at a first continuous speed from the infeed section towards the gripping stretch, and at a second speed, lower than the first continuous speed, when the first group of the housings and the second group of the housing are at the gripping stretch, to allow the gripping and transferring system to grip the containers.

12. The system according to claim 11, wherein the conveying system further comprises a belt carrying the first group of the housings and the second group of the housings, two translatory pulleys, around which the belt is looped and a movement system configured to move the two translatory pulleys along an orientation parallel to a center to center line of the two translatory pulleys.

13. A machine for filling and weighing containers, comprising:
the system for weighing containers according to claim 1, for weighing empty containers to be filled;
a filling station that receives the empty containers, weighed in the system for weighing containers, and fills the containers with a filling product; and
a further system for weighing the containers filled in the filling station.

14. A method for weighing containers, comprising the steps of:
conveying a plurality of containers along a conveying path, from an infeed section towards a gripping stretch of the path;
gripping the containers at the gripping stretch of the path and transferring the containers to a weighing station;
weighing the containers;
after weighing the containers, gripping the containers and transferring the containers to a release stretch of the conveying path;
conveying the containers from the release stretch toward an outfeed section;
during the conveying of the containers from the infeed section to the gripping stretch, conveying at least a first group of the containers and a second group of the containers independently of each other.

15. The method according to claim 14, and further comprising providing that the gripping stretch and the release stretch extend along a first orientation; and transferring the containers from the gripping stretch to the weighing station and from the weighing station to the release stretch along a second orientation, perpendicular to the first orientation.

16. The method according to claim 14, wherein during the conveying of the containers from the release stretch to the outfeed section, conveying at least a third group of the containers and a fourth group of the containers independently of each other.

17. The system according to claim 5, wherein the gripping and transferring system comprises two parallel rows of the gripper elements that are connected and suitably spaced apart to simultaneously transfer, with a single movement, the weighed containers, on the scales, from the weighing station to the release stretch, and the containers, to be weighed, from the gripping stretch to the scales of the weighing station.

18. The system according to claim 1, wherein the gripping and transferring system comprises two parallel rows of the gripper elements that are connected and suitably spaced apart to simultaneously transfer, with a single movement, the weighed containers, on the scales, from the weighing station to the release stretch, and the containers, to be weighed, from the gripping stretch to the scales of the weighing station.

\* \* \* \* \*